(12) United States Patent  (10) Patent No.: US 8,289,826 B2
Nemoto et al.  (45) Date of Patent: Oct. 16, 2012

(54) OPTICAL PICKUP AND OPTICAL DISC APPARATUS

(75) Inventors: Kazuhiko Nemoto, Kanagawa (JP); Midori Kanaya, Tokyo (JP); Katsuhiro Seo, Kanagawa (JP); Tamotsu Ishii, Chiba (JP)

(73) Assignee: Sony Corporation, Tokyo (JP)

( * ) Notice: Subject to any disclaimer, the term of this patent is extended or adjusted under 35 U.S.C. 154(b) by 29 days.

(21) Appl. No.: 12/977,153

(22) Filed: Dec. 23, 2010

(65) Prior Publication Data

US 2011/0164488 A1 Jul. 7, 2011

(30) Foreign Application Priority Data

Jan. 6, 2010 (JP) ................................. 2010-001414

(51) Int. Cl.
G11B 7/00 (2006.01)
(52) U.S. Cl. ............ 369/44.41; 369/112.01; 369/124.12
(58) Field of Classification Search ............... 369/44.41, 369/44.42, 112.01, 112.03, 112.1, 112.12, 369/112.15, 112.07, 109.1, 124.12, 124.01, 369/112.04, 112.05, 112.06, 44.28
See application file for complete search history.

(56) References Cited

U.S. PATENT DOCUMENTS 8,045,443 B2 * 10/2011 Sato .......................... 369/112.03
* cited by examiner Primary Examiner — Nabil Hindi
(74) Attorney, Agent, or Firm — Wolf, Greenfield & Sacks, P.C.

(57) ABSTRACT

Provided is an optical pickup including: a light-source emitting a light-beam; an objective lens collecting the light-beam on a desired recording layer among one or two recording layers or more installed in an optical disc and where spirally- or concentrically-shaped tracks are formed; a lens-moving unit moving the objective lens in a tracking direction toward at least an inner-circumference or outer-circumference side; a light splitting device splitting a reflected light-beam into reflected light-beams and propagating the light-beams; a light-detecting device generating central, inner-circumference-side, and outer-circumference-side light-detecting signals according to received light amounts thereof by central, inner-circumference-side, and outer-circumference-side light-detecting areas, receiving central, inner-circumference-side, and outer-circumference-side portions of an image of the reflected light-beam in the radial direction and allowing a signal processing unit to generate a tracking error signal by using the inner-circumference-side and outer-circumference-side-light-detecting signals, being added with a product of a predetermined coefficient and the central-light-detecting signal.

6 Claims, 27 Drawing Sheets

FIG. 1A
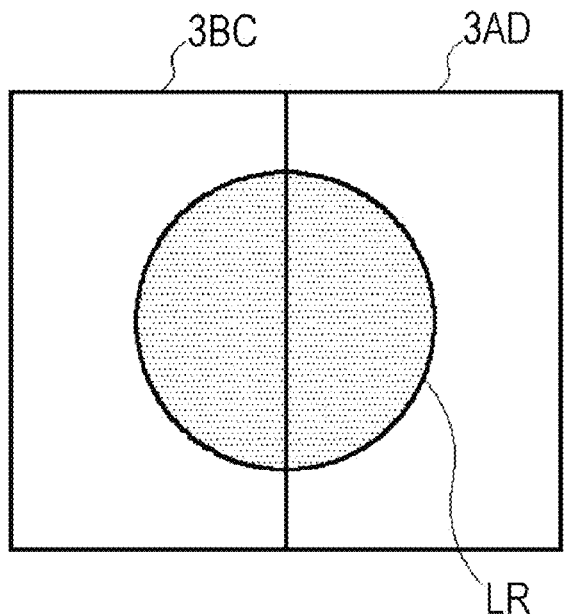
FIG. 1B
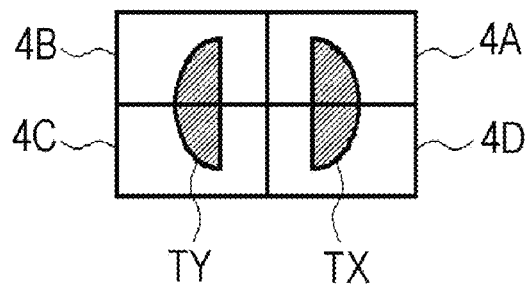
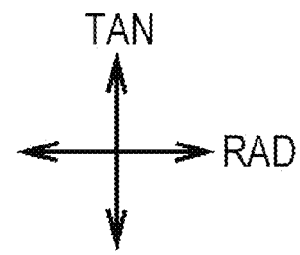

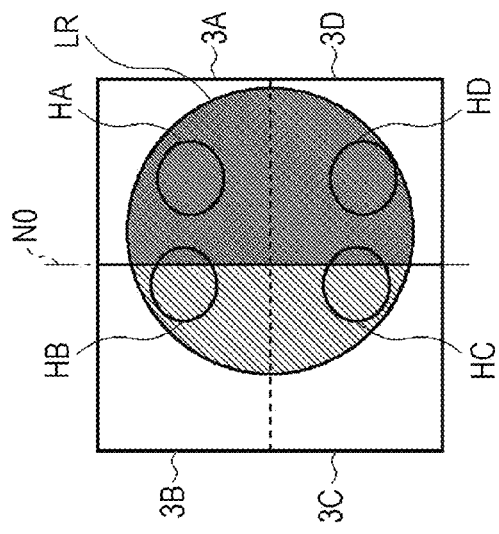
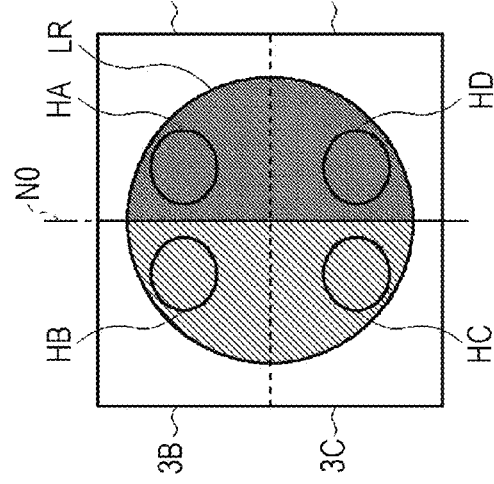
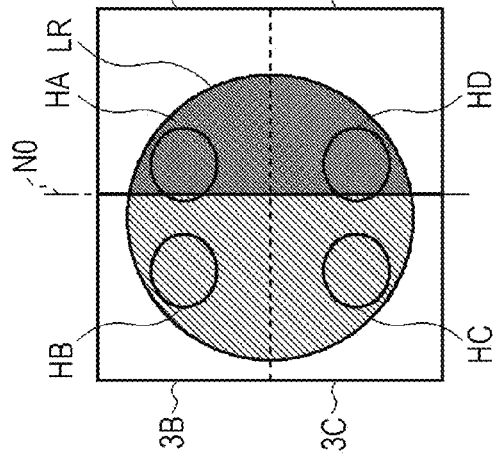

FIG. 3A
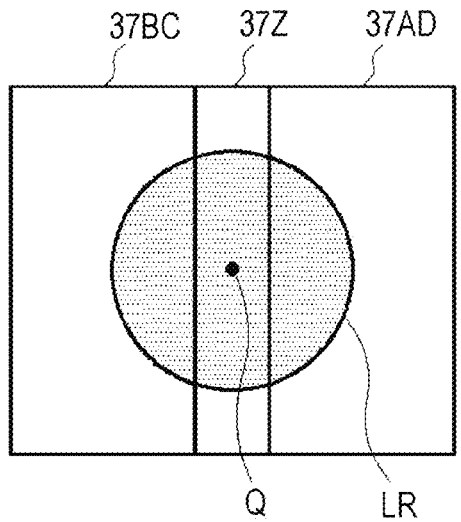
FIG. 3B
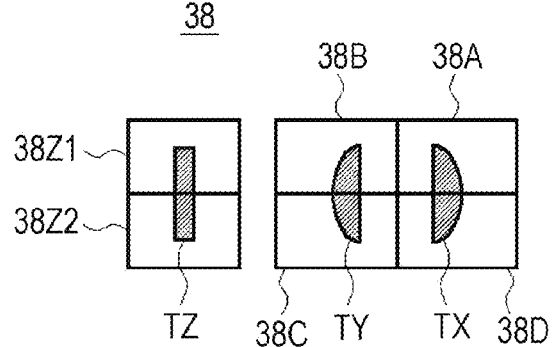
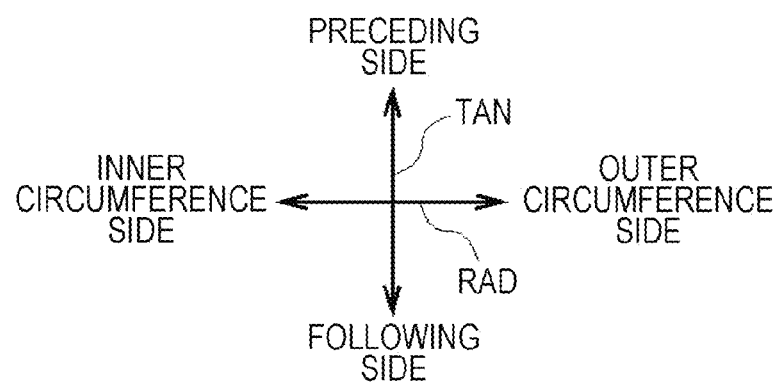

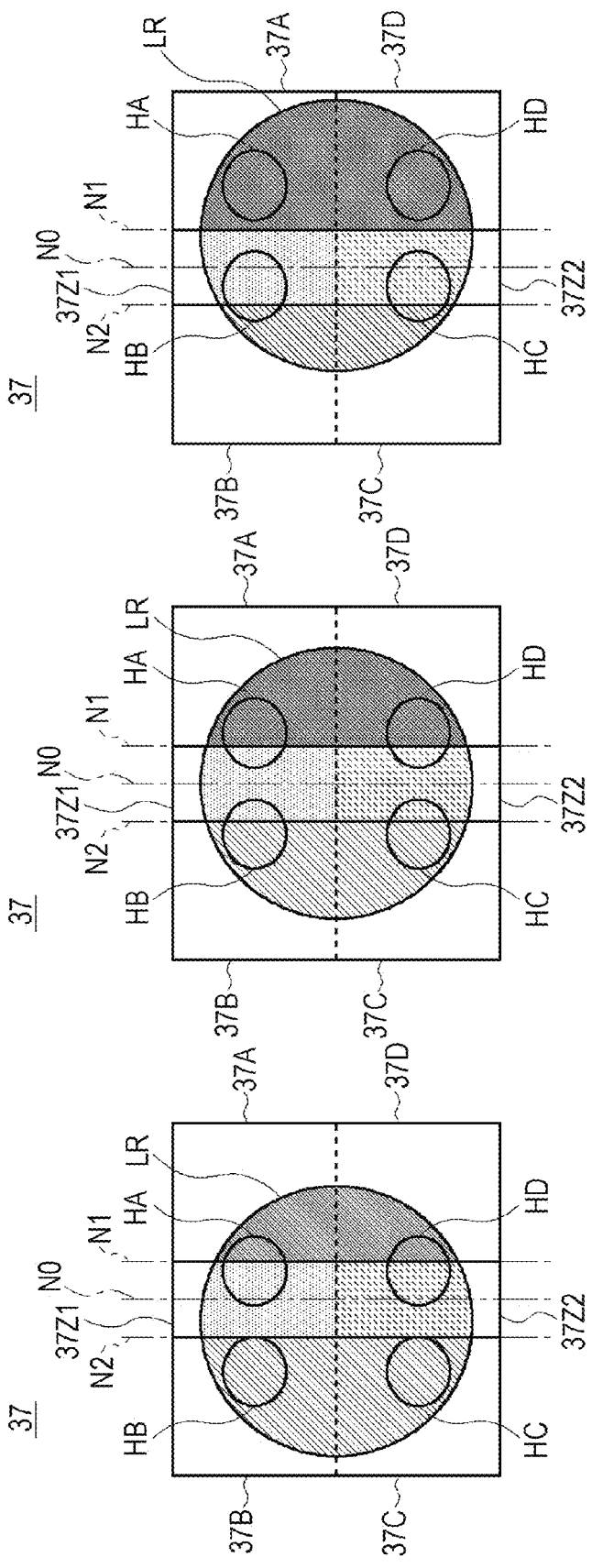

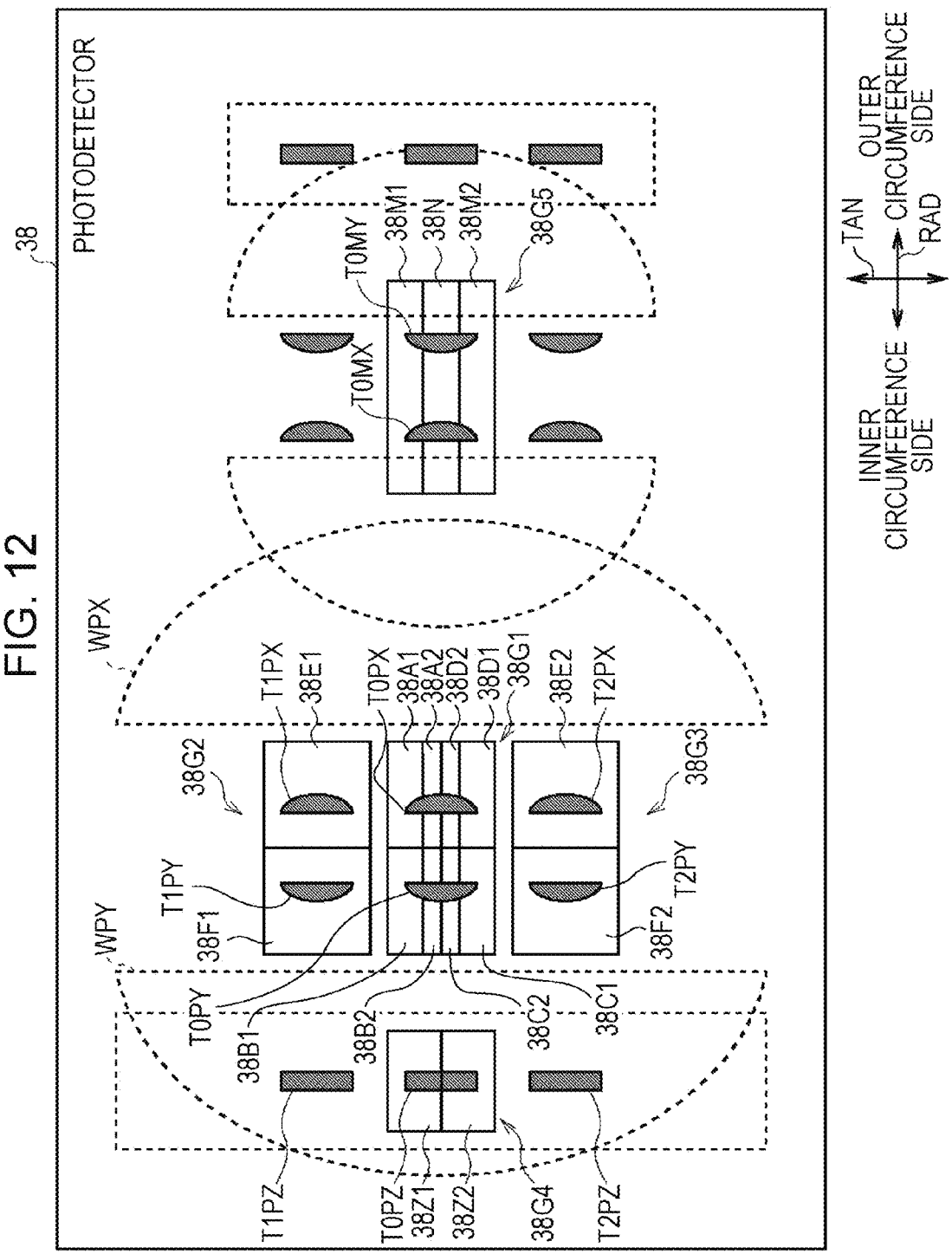

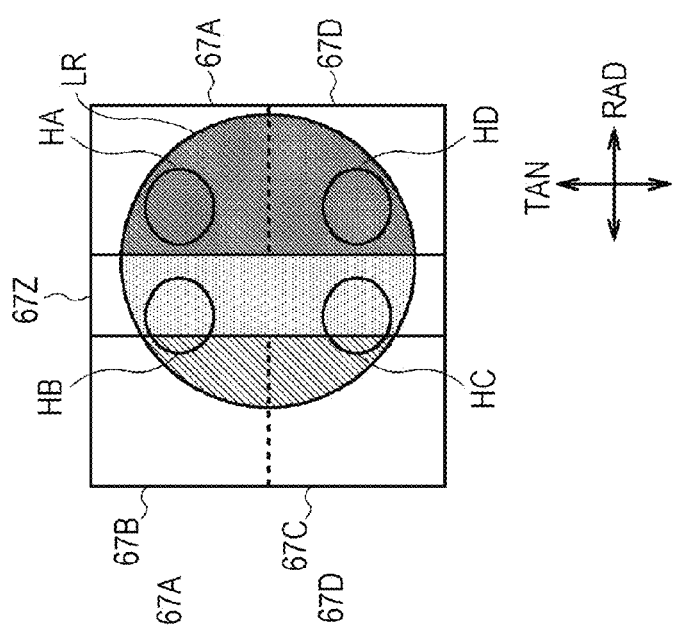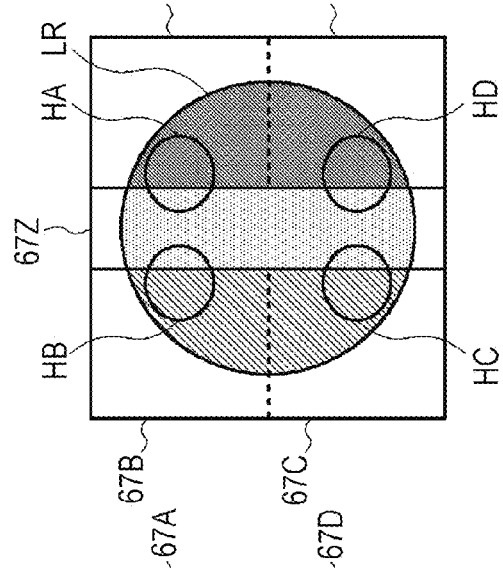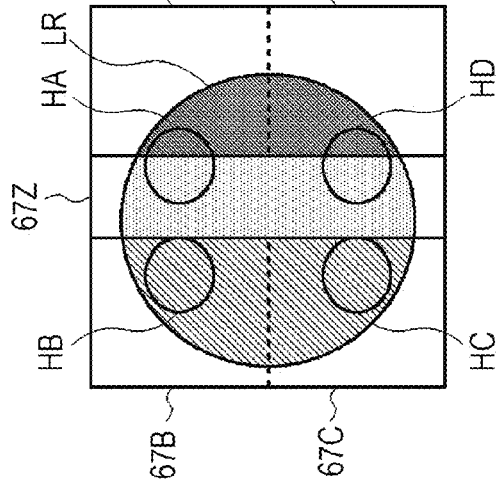

FIG. 18A
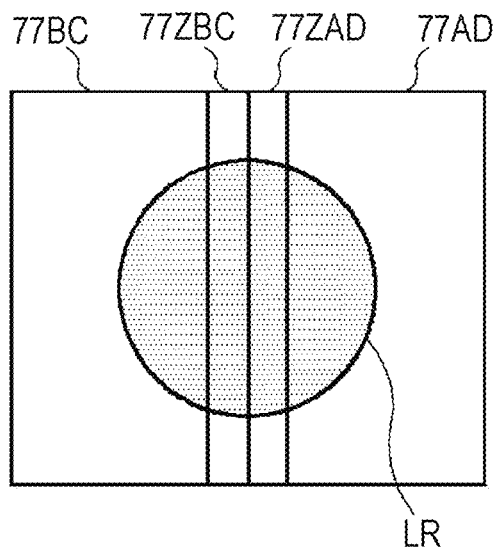
FIG. 18B
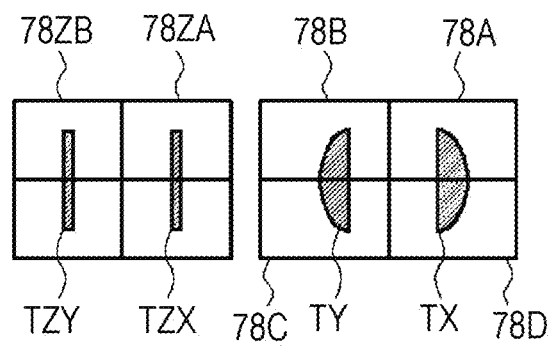
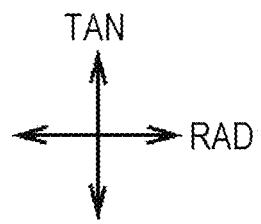

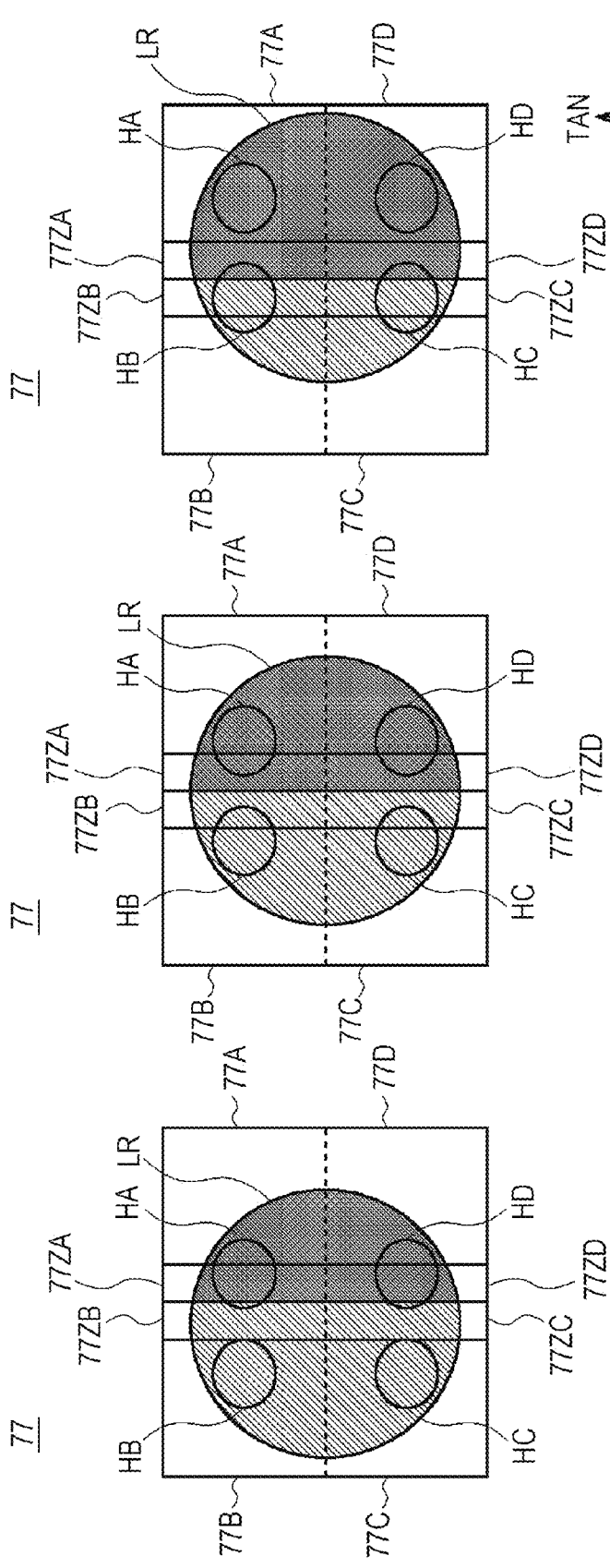

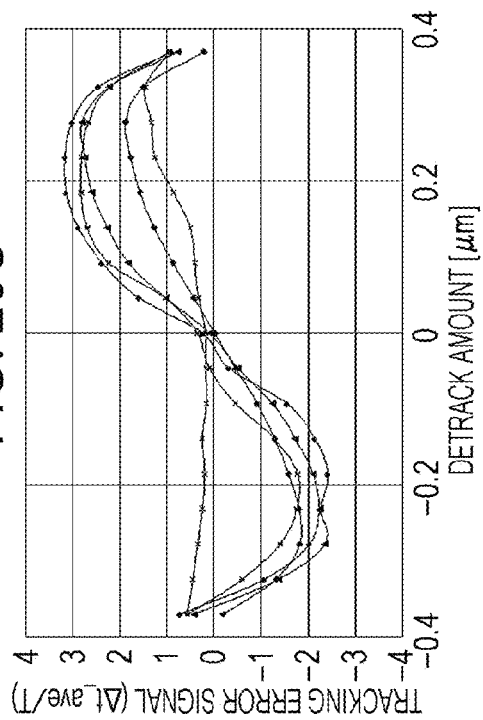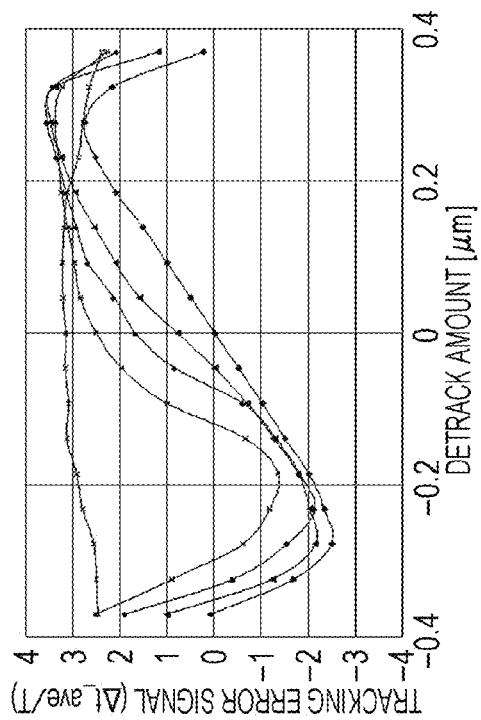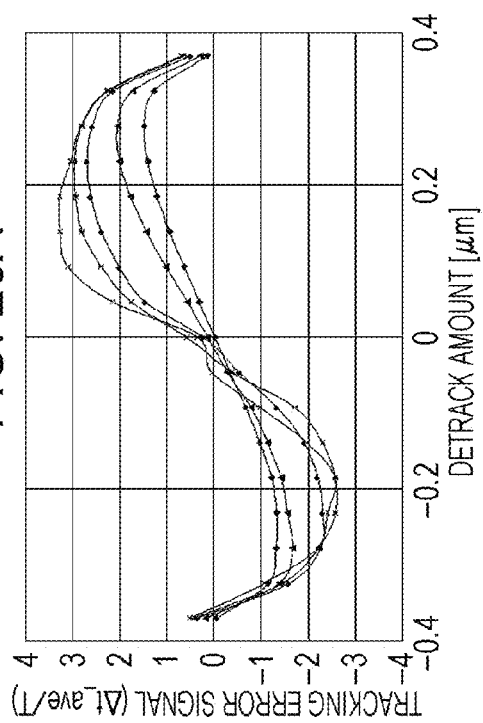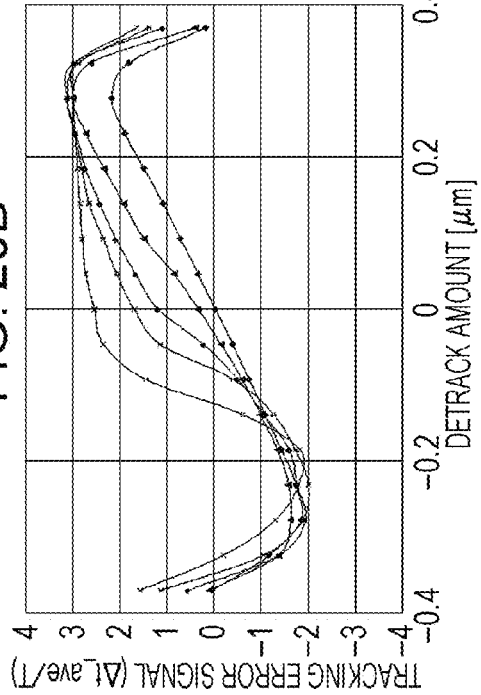

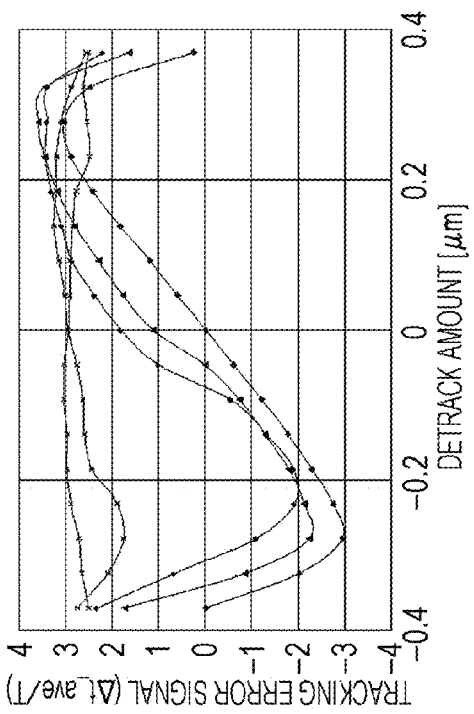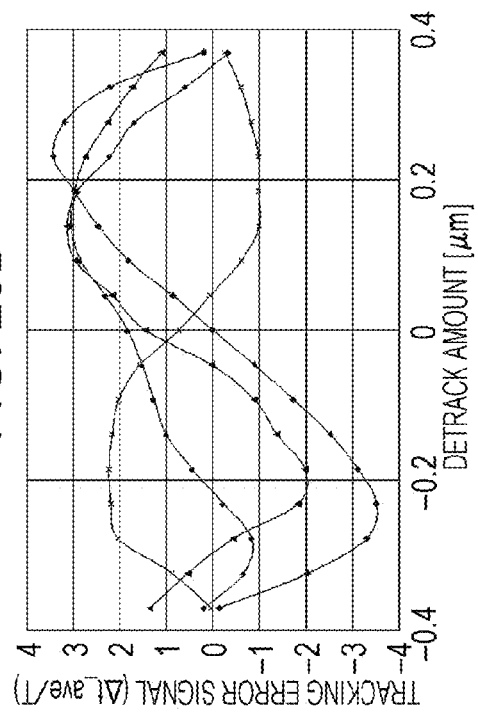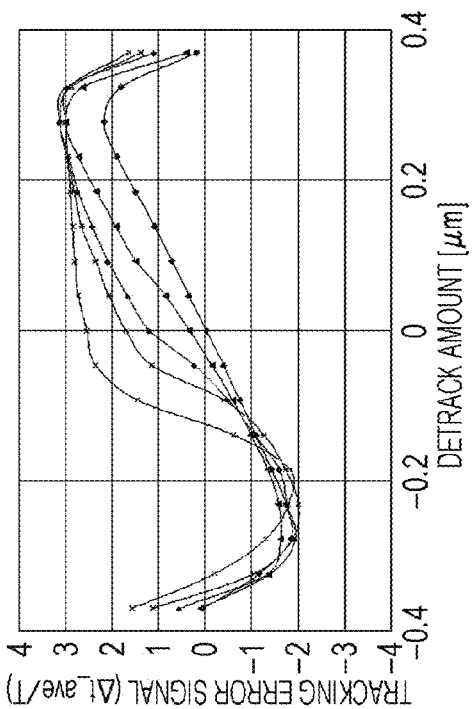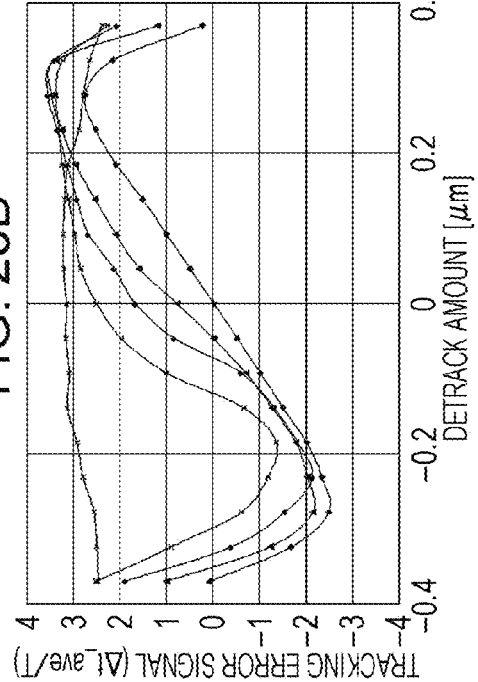

FIG. 31A
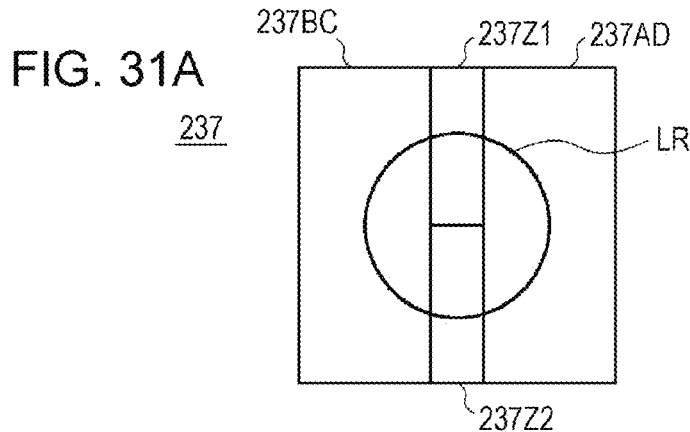
FIG. 31B
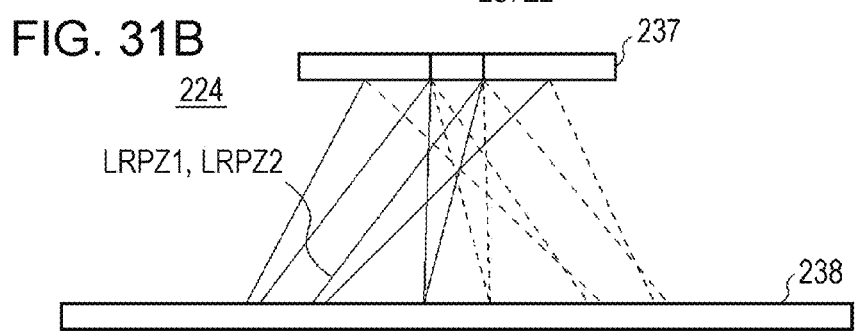
FIG. 31C
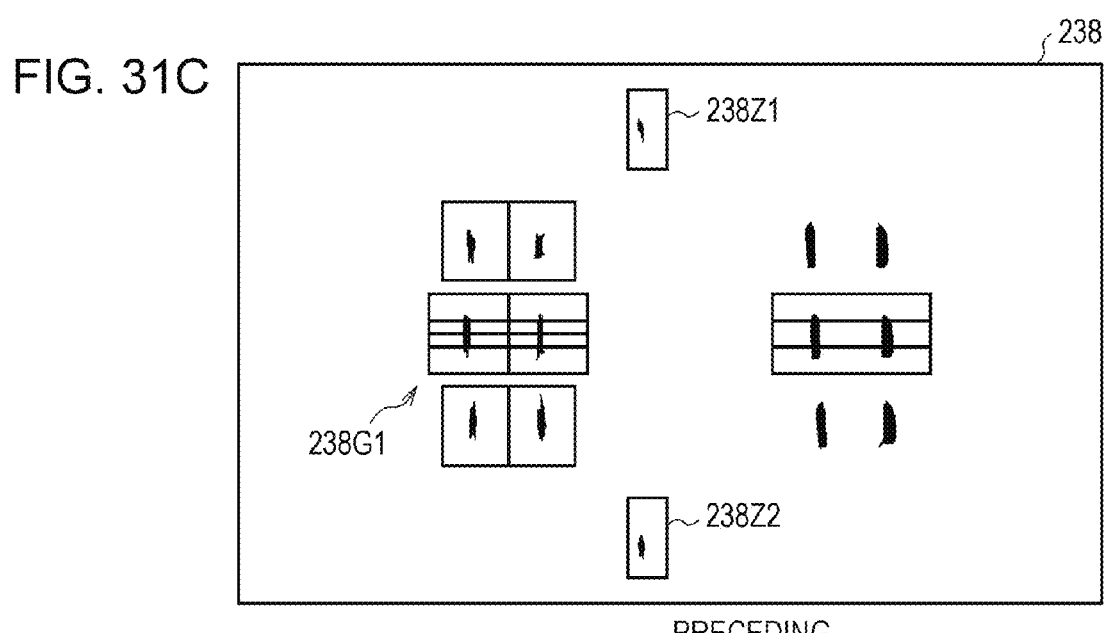
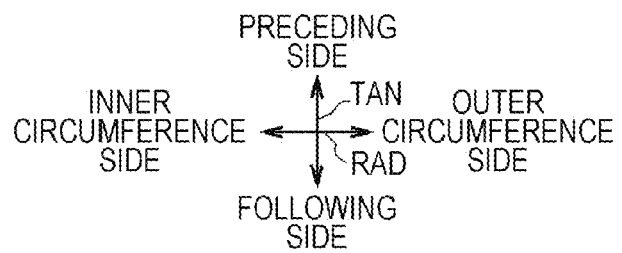

OPTICAL PICKUP AND OPTICAL DISC APPARATUS

BACKGROUND OF THE INVENTION

1. Field of the Invention

The present invention relates to an optical pickup and an optical disc apparatus and is very appropriately adapted to, for example, an optical disc apparatus corresponding to an optical disc having a plurality of recording layers.

2. Description of the Related Art

In the related art, optical disc apparatuses recording information on optical discs such as a CD (Compact Disc), a DVD (Digital Versatile Disc), and a Blu-ray Disc (a registered trade mark, hereinafter, referred to as BD) and reading the information from the optical disc has been widely used.

In general, the optical disc apparatus collects a light beam through an objective lens and illuminates a track, which is formed on a recording layer of the optical disc in a spiral shape or a concentric shape, with the light beam.

At this time, the optical disc apparatus generates a focus error signal and a tracking error signal representing deviation amounts of the desired track, to which the focus of the light beam is aligned, and the focus of the light beam in the focus direction and the tracking direction.

Next, the optical disc apparatus allows the focus of the light beam to trace the desired track by performing the focusing control and the tracking control of the objective lens based on the focus error signal and the tracking error signal.

On the other hand, as a method of generating the tracking error signal, various methods are proposed. As one of the methods, a phase comparison method (sometimes, referred to as a DPD (Differential Phase Detection) method) is known (for example, refer to Japanese Unexamined Patent Application Publication No. 9-180212 (FIGS. 13A to 13C and FIGS. 14A to 14C)).

For example, FIGS. 1A and 1B diagrammatically illustrate configurations of a hologram plate 3 and a photodetector 4 assembled in an optical pickup 2 (not shown) of an optical disc apparatus 1 corresponding to the DPD method.

The optical pickup 2 is configured to illuminate the optical disc (not shown) with a predetermined light beam L, to divide a reflected light beam LR including the reflected light by the hologram plate 3, and to receive light so that each of the divided light beams is further divided when the light is received by the photodetector 4.

The hologram plate 3 is divided into two areas 3AD and 3BC in a radial (RAD) direction (the direction corresponding to the radial direction of the optical disc, that is, the horizontal direction in the figure) and is set so that the reflected light beam LR is diffracted in the opposite directions with respect to the radial direction by the holograms formed in the respective areas.

In the photodetector 4, a plurality of the light detecting areas 4A, 4D, 4B, and 4C are disposed to be adjacent to each other in the tangential (TAN) direction (the direction corresponding to the tangential direction of the track of the optical disc, that is, the vertical direction in the figure).

The light detecting areas 4A and 4D receive the spot TX corresponding to the area 3AD in a manner of division by two in the tangential direction to generate light detecting signals SA and SD. In addition, the light detecting areas 4B and 4C receive the spot TY corresponding to the area 3BC in a manner of division by two in the tangential direction to generate light detecting signals SB and SC.

Herein, as illustrated in FIG. 2B, it is known that ranges (hereinafter, referred to as phase changing ranges HA, HB, HC, and HD) where the light intensity is changed according to the tracking state of the light beam L are formed in the reflected light beam LR.

For this reason, the optical pickup 2 receives light so that independent light detecting areas 4A to 4D (FIG. 1) includes the corresponding phase changing ranges HA to HD. Therefore, the light detecting signals SA to SD appropriately representing the light intensities may be generated.

In addition, in FIGS. 2A to 2C, in an image of the reflected light beam LR, the division lines (indicated by solid lines) by the hologram plate 3 are repeatedly illustrated, and the division lines (indicated by broken lines) of the case where the reflected light beam LR is divided by the light detecting areas of the photodetector 4 are repeatedly illustrated. In addition, for the convenience of description, the areas of the case where the hologram plate 3 is divided by two division lines are referred to as divided areas 3A, 3B, 3C, and 3D.

The optical disc apparatus 1 generates phase signals φSA, φSB, φSC, and φSD indicating phases of the light detecting signals SA, SB, SC, and SD and, after that, generates the tracking error signal based on the DPD method according to the following Equation (1) by using a predetermined signal processing circuit or the like.

[Equation 1]

$$STE=(\phi SA-\phi SB)+(\phi SC-\phi SD) \quad (1)$$

After that, the optical disc apparatus 1 performs the tracking control based on the tracking error signal STE.

SUMMARY OF THE INVENTION

However, in the optical pickup 1, the objective lens is moved in the tracking direction (that is, the radial direction) through the tracking control, so that the so-called lens shift occurs, where the optical path of the reflected light beam LR is moved in the direction corresponding to the radial direction.

As illustrated in FIGS. 2A and 2C, in the case where the lens shift occurs, the position of the illumination of the reflected light beam LR on the hologram plate 3 is moved in the radial direction, so that the shape of the spot formed in each of the light detecting areas of the photodetector 4 is changed.

Particularly, in the case of FIG. 2A, the phase changing ranges HA and HD intrude into the divided areas 3B and 3C, respectively. In addition, in the case of FIG. 2C, the phase changing ranges HB and HC intrude into the divided areas 3A and 3D, respectively.

In this manner, in the case where the phase changing ranges AR1 to AR4 intrude into the plurality of the divided areas, phase differences of the phase changing ranges HA to HD are not correctly reflected in the phase signals φSA to φSD.

As a result, in the optical disc apparatus 20, there is a problem in that the quality of the tracking error signal STE is deteriorated, so that the accuracy of the tracking control is deteriorated.

It is desirable to provide an optical pickup and an optical disc apparatus capable of preventing a deterioration of accuracy of tracking control caused by lens shift.

According to an embodiment of the invention, there is an optical pickup including: a light source configured to emit a light beam; an objective lens configured to collect the light beam on a desired recording layer among one recording layer or two recording layers or more which are installed in an optical disc and where tracks having a spiral shape or a concentric shape are formed; a lens moving unit configured to move the objective lens in a tracking direction directing toward at least an inner circumference side or an outer circumference side of the optical disc; a light splitting device configured to split a reflected light beam reflected by recording layer into a plurality of reflected light beams and to propagate the plurality of reflected light beams; and a light detection device configured to generate a central light detecting signal, an inner circumference side light detecting signal, and an outer circumference side light detecting signal according to received light amounts thereof by a central light detecting area, an inner circumference side light detecting area, and an outer circumference side light detecting area, which receive a central portion, an inner circumference side portion, and an outer circumference side portion of an image of the reflected light beam in the radial direction of the optical disc and to allow a predetermined signal processing unit to generate a tracking error signal by using the inner circumference side light detecting signal and the outer circumference side light detecting signal, each of which is added with a product of a predetermined coefficient and the central light detecting signal.

In the optical pickup according to the invention, even in the case where the changing range where the light intensity is changed according to the focus deviation amount in the tracking direction on the image of the reflected light beam exceeds the center line of the light splitting device in the radial direction to be moved due to the lens shift, it is possible to receive the light intensity in the changing range by the central light detecting area. For this reason, in the optical pickup, the signal processing unit adds the central light detecting signal multiplied with a coefficient to each of the inner circumference side light detecting signal and the outer circumference side light detecting signal, so that it is possible to generate a high-quality tracking error signal where the light intensity in the changing range is reflected without omission.

According to another embodiment of the invention, there is an optical disc apparatus including: a light source configured to emit a light beam; an objective lens configured to collect the light beam on a desired recording layer among one recording layer or two recording layers or more which are installed in an optical disc and where tracks having a spiral shape or a concentric shape are formed; a lens moving unit configured to move the objective lens in a tracking direction directing toward at least an inner circumference side or an outer circumference side of the optical disc; a light splitting device configured to split a reflected light beam reflected by recording layer into a plurality of reflected light beams and to propagate the plurality of reflected light beams; a light detection device configured to generate a central light detecting signal, an inner circumference side light detecting signal, and an outer circumference side light detecting signal according to received light amounts thereof by a central light detecting area, an inner circumference side light detecting area, and an outer circumference side light detecting area, which receive a central portion, an inner circumference side portion, and an outer circumference side portion of an image of the reflected light beam in the radial direction of the optical disc; and a signal processing unit configured to generate a tracking error signal based on the inner circumference side light detecting signal and the outer circumference side light detecting signal, each of which is added with a product of a predetermined coefficient and the central light detecting signal.

In the optical disc apparatus according to the invention, even in the case where the changing range where the light intensity is changed according to the focus deviation amount in the tracking direction on the image of the reflected light beam exceeds the center line of the light splitting device in the radial direction to be moved due to the lens shift, it is possible to receive the light intensity in the changing range by the central light detecting area. For this reason, in the optical disc apparatus, the signal processing unit adds the central light detecting signal multiplied with a coefficient to each of the inner circumference side light detecting signal and the outer circumference side light detecting signal, so that it is possible to generate a high-quality tracking error signal where the light intensity in the changing range is reflected without omission.

According to the invention, even in the case where the changing range where the light intensity is changed according to the focus deviation amount in the tracking direction on the image of the reflected light beam exceeds the center line of the light splitting device in the radial direction to be moved due to the lens shift, it is possible to receive the light intensity in the changing range by the central light detecting area. For this reason, in the optical pickup, the signal processing unit adds the central light detecting signal multiplied with a coefficient to each of the inner circumference side light detecting signal and the outer circumference side light detecting signal, so that it is possible to generate a high-quality tracking error signal where the light intensity in the changing range is reflected without omission. Accordingly, in the invention, it is possible to implement an optical pickup capable of preventing deterioration in accuracy of the tracking control caused by the lens shift.

In addition, according to the invention, even in the case where the changing range where the light intensity is changed according to the focus deviation amount in the tracking direction on the image of the reflected light beam exceeds the center line of the light splitting device in the radial direction to be moved due to the lens shift, it is possible to receive the light intensity in the changing range by the central light detecting area. For this reason, in the optical disc apparatus, the signal processing unit adds the central light detecting signal multiplied with a coefficient to each of the inner circumference side light detecting signal and the outer circumference side light detecting signal, so that it is possible to generate a high-quality tracking error signal where the light intensity in the changing range is reflected without omission. Accordingly, in the invention, it is possible to implement an optical disc apparatus capable of preventing deterioration in accuracy of the tracking control caused by the lens shift.

BRIEF DESCRIPTION OF THE DRAWINGS

FIGS. 1A and 1B are schematic diagrams illustrating spot dividing light reception in the related art.

FIGS. 2A to 2C are schematic diagrams illustrating a relationship between a phase changing range and a divided area in the related art.

FIGS. 3A and 3B are schematic diagrams illustrating spot dividing light reception according to a first embodiment.

FIGS. 4A to 4C are schematic diagrams illustrating a relationship between a phase changing range and a divided area according to the invention.

FIG. 12 is a schematic diagram illustrating a configuration of a photodetector according to the first embodiment.

FIGS. 16A to 16C are schematic diagrams illustrating a relationship between a phase changing range and a divided area in the related art.

FIGS. 18A and 18B are schematic diagrams illustrating spot dividing light reception in the related art.

FIGS. 19A to 19C are schematic diagrams illustrating a relationship between a phase changing range and a divided area in the related art.

FIGS. 20A to 20D are schematic diagrams illustrating a relationship between a detrack amount and a tracking error signal.

FIGS. 23A to 23D are schematic diagrams illustrating a relationship between a detrack amount and a tracking error signal when an optical disc having a pit height of $\lambda/6$ is used for an optical disc apparatus in the related art.

FIGS. 31A to 31C are schematic diagrams illustrating configurations of a hologram plate and a photodetector according to another embodiment.

DESCRIPTION OF THE PREFERRED EMBODIMENTS

Figure 5:
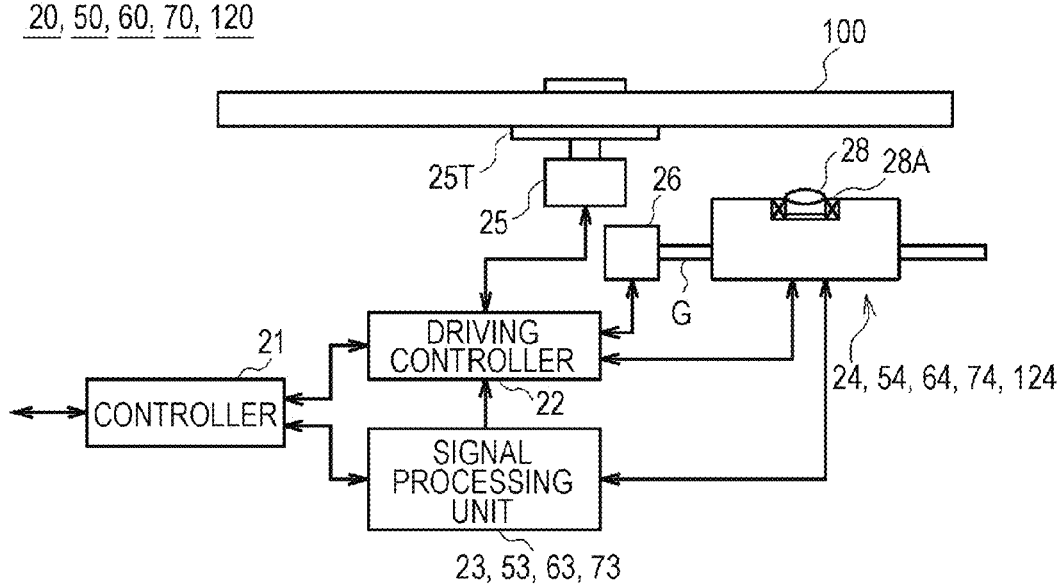
FIG. 5 is a schematic diagram illustrating a whole configuration of an optical disc apparatus.

Hereinafter, embodiments (hereinafter, referred to as embodiments) for implementing the invention are described with reference to the drawings. In addition, the description is made in the following order.

1. First Embodiment (Example where a central area in a hologram plate is not divided in a tangential direction)

2. Second Embodiment (Example where a central area in a hologram plate is divided in a tangential direction)

3. Other Embodiments

1. First Embodiment

[1-1. Basic Principle of First Embodiment]

First, the basic principle of a first embodiment of the invention is described. FIGS. 3A and 3B corresponding to FIGS. 1A and 1B diagrammatically illustrate basic configurations of a hologram plate 37 and a photodetector 38 according to the first embodiment.

In addition, in FIGS. 3A and 3B, directions are defined according to a relationship between the optical disc and an image obtained when the reflected light beam LR is reflected on the optical disc. In other words, in FIGS. 3A and 3B, the left/right direction of the figure corresponds to the radial direction of the optical disc; the left side of the figure corresponds to the inner circumference side of the optical disc; and the right side of the figure corresponds to the outer circumference side. In addition, in FIGS. 3A and 3B, the up/down direction of the figure corresponds to the tangential direction of the optical disc; the upper side of the figure corresponds to the preceding side of the track tracking direction; and the lower side of the figure corresponds to the following side thereof. The same definitions are used in the figures hereinafter.

The hologram plate 37 is divided into three, that is, into a central area 37Z and areas 37AD and 37BC, which are remaining portions, in the radial direction, so that holograms having different diffraction directions are formed in the areas.

In other words, the peripheral areas 37AD and 37BC diffract portions (hereinafter, referred to as reflected light beams LRY and LRX) of the reflected light beam LR, which are illuminated on the areas, in the opposite directions with respect to the radial direction.

In addition, the central area 37Z diffracts a portion (hereinafter, referred to as a reflected light beam LRZ) of the reflected light beam LR, which is illuminated on the area, at a diffraction angle larger than that of the case of the reflected light beam LRY with respect to the radial direction, that is, diffracted more towards the outer side than the reflected light beam LRY (to the inner circumference side).

In addition, the hologram plate 37 is substantially symmetric in the radial direction with respect to the center point Q corresponding to the center of the reflected light beam LR in terms of design.

The photodetector 38 includes light detecting areas 38A and 38D which receive the spot TX generated from the reflected light beam LRX, light detecting areas 38B and 38C which receive the spot TY generated from the reflected light beam LRY, and light detecting areas 38Z1 and 38Z2 which receive the spot TZ generated from the reflected light beam LRZ.

The light detecting areas 38A and 38D are disposed to be adjacent to each other in the tangential direction, so that the spot TX generated from the reflected light beam LRX is divided into two in the tangential direction and the divided spots are received.

Similarly, with respect to the light detecting areas 38B and 38C and the light detecting areas 38Z1 and 38Z2, each of the spot TY generated from the reflected light beam LRY and the spot TZ generated from the reflected light beam LRZ is divided into two in the tangential direction and the divided spots are received.

The light detecting areas 38A, 38B, 38C, 38D, 38Z1, and 38Z2 generate respective light detecting signals SA, SB, SC, SD, SZ1, and SZ2 according to the received light amounts thereof.

In this manner, in the first embodiment, the reflected light beam LRZ, which is the central portion of the reflected light beam LR in the radial direction, is split from the reflected light beams LRX and LRY, which are peripheral portions, and divided into two in the tangential direction to be received.

Herein, as illustrated in FIG. 4B corresponding to the FIG. 2B, in an image of the reflected light beam LR, the division lines (indicated by solid lines) by the hologram plate 38 are repeatedly illustrated, and the division lines (indicated by broken lines) of the case where the reflected light beam LR is divided by the light detecting areas of the photodetector 38 are repeatedly illustrated. In addition, for the convenience of description, the areas of the case where the hologram plate 13 is divided by the division lines are referred to as divided areas 37A, 37B, 37C, and 37D and divided areas 37Z1 and 37Z2.

The divided areas 37A to 37D are narrower than the divided areas 3A to 3D (FIGS. 2A to 2C) in the related art. The difference in area with respect to the divided areas 3A to 3D becomes half the area of each of the divided areas 37Z1 and 37Z2.

Therefore, as expressed in the following Equations (2) to (5), first, the signal processing unit according to the first embodiment generates each of the central values SMA, SMB, SMC, and SMD by adding a product of ½ and the light detecting signal SZ1 or SZ2 of the adjacent central portion to each of the light detecting signals SA, SB, SC, and SD of the peripheral portions.

[Equation 2]

$$SMA = SA + (½)SZ1 \quad (2)$$

[Equation 3]

$$SMB = SB + (½)SZ1 \quad (3)$$

[Equation 4]

$$SMC = SC + (½)SZ2 \quad (4)$$

[Equation 5]

$$SMD = SD + (½)SZ2 \quad (5)$$

Due to the principle of calculation of the central values SMA to SMD, if the lens shift does not occur but the distribution of light intensity of the reflected light beam LR is uniform, the central values SMA to SMD are equal to the light detecting signals SA to SD in the related art, respectively.

Herein, a portion of the phase changing range HA of the reflected light beam LR intrudes into the divided area 37Z1. Therefore, a signal component (hereinafter, referred to as a phase component SHA) caused by the phase changing range HA is included in the central value SMA obtained according to Equation (2) at a relatively high ratio thereof.

Similarly, signal components (hereinafter, referred to as phase components SHB, SHC, and SHD) caused by the phase changing ranges HB, HC, and HD are included in the central values SMB, SMC, and SMD obtained according to Equations (3) to (5) at relatively high ratios thereof.

Subsequently, the signal processing unit generates phase signals φSMA, φSMB, φSMC, and φSMD indicating phases of the central values SMA, SMB, SMC, and SMD and generates the tracking error signal STE based on the DPD method according to the following Equation (6).

[Equation 6]

$$STE = (\phi SMA - \phi SMB) + (\phi SMC - \phi SMD) \quad (6)$$

Therefore, the signal processing unit may generate the tracking error signal STE which includes the phase components SHA, SHB, SHC, and SHD at high ratios.

In addition, although the phase component SHB caused by the phase changing range HB is also included in the central value SMA, since the light detecting signal SZ1 is multiplied with ½ according to Equation (2), the influence thereof is decreased. With respect to the central signals SMB to SMD, the same description is made.

Next, FIGS. 4A and 4C corresponding to FIGS. 2A and 2C illustrate the case where the lens shift occurs.

Herein, referring to the phase changing range HA, a portion thereof exceeds the divided area 3A and intrudes into the divided area 3B in FIG. 2A, but the portion is included in the divided areas 37A and 37Z1 so as not to protrude inwards into the divided area 37B in FIG. 4A.

For this reason, although a portion of the central value SMA is multiplied with the coefficient ½, the central value SMA calculated according to Equation (2) includes the phase component SHA caused by the entire portions of the phase changing range HA at a relatively high ratio. In addition, similarly, the central value SMD calculated according to Equation (5) also includes the phase component SHD caused by the entire portions of the phase changing range HD at a relatively high ratio.

On the other hand, the case of FIG. 4C and the case of FIG. 4A are symmetric with respect to the radial direction.

For this reason, the central value SMB calculated according to Equation (3) includes the phase component SHB caused by the entire portions of the phase changing range HB at a relatively high ratio. In addition, similarly, the central value SMC calculated according to Equation (4) also includes the phase component SHC caused by the entire portions of the phase changing range HC at a relatively high ratio.

In other words, the central values SMA to SMD include the phase components SHA to SHD at relatively high ratios, respectively. For this reason, the tracking error signal STE calculated according to Equation (6) has high quality so that the phase difference components in the phase changing ranges HA to HD are appropriately reflected thereon.

In this manner, in the first embodiment, the central values SMA to SMD are obtained by adding ½ times the light detecting signal SZ1 or SZ2 of the central portion to the light detecting signals SA to SD of the peripheral portions, and a high-quality tracking error signal STE is generated by using the phase signals φSMA to φSMD.

[1-2. Configuration of Optical Disc Apparatus]

Next, configurations of the optical disc apparatus 20 and the optical pickup 24 according to the first embodiment are described. As illustrated in FIG. 5, the optical disc apparatus 20 is configured to record information on, for example, a DVD type optical disc 100 and to reproduce information from the optical disc 100. As illustrated in FIG. 6A, the optical disc 100 is provided with two layers, that is, recording layers Y0 and Y1.

The entire optical disc apparatus 20 is controlled by a controller 21. The controller 21 is mainly configured with a CPU (Central Processing Unit) (not shown) to read various types of programs from a ROM (Read Only Memory) (not shown) and deploys the programs in a RAM (Random Access Memory) (not shown). Therefore, the controller 21 is configured to execute various types of processes such as an information recording process and an information reproducing process.

For example, in the case of recording information in the optical disc 100, the controller 21 receives an information recording command, recorded information, and recording address information from an external apparatus (not shown) or the like and supplies the recording address information and a driving command to a driving controller 22 and supplies the recorded information to a signal processing unit 23. In addition, the recording address information is information indicating an address where the recorded information is to be recorded.

The driving controller 22 controls driving a spindle motor 25 according to the driving command to rotate the optical disc 100 mounted on a turntable 25T at a predetermined rotation speed. In addition, the driving controller 22 controls driving a thread motor 26 to move an optical pickup 24 along a movement axis G to a position corresponding to the recording address information in a radial direction (that is, an inner circumference direction or an outer circumference direction) of the optical disc 100.

The signal processing unit 23 performs various types of signal processes such as a predetermined encoding process or a modulating process on the supplied recorded information to generate a recorded signal and supplies the recorded signal to the optical pickup 24.

The optical pickup 24 performs focusing control and tracking control (described later in detail) of an objective lens 28 to align a focus F of a light beam L to a desired recording layer Y (hereinafter, referred to as a target recording layer YT) of the optical disc 100. In addition, the optical pickup 24 adjusts a light intensity of the light beam L according to the recorded signal from the signal processing unit 23 to record the information on the recording layer of the optical disc 100.

In addition, in the case of reproducing information from the optical disc 100, if the controller 21 receives, for example, information reproducing command from an external apparatus (not shown), the controller 21 supplies a driving command to the driving controller 22 and supplies a reproducing process command to the signal processing unit 23.

Similarly to the case of recording information, the driving controller 22 rotates the optical disc 100 at a predetermined rotation speed to move the optical pickup 24 to a position corresponding to the information reproducing command.

The optical pickup 24 performs the focusing control and the tracking control of the objective lens 28 to align the focus F of the light beam L on the target recording layer YT of the optical disc 100 and to adjust the light intensity of the light beam L to a light intensity for reproduction.

The light beam L is reflected on the recording layer to become the reflected light beam LR. The optical pickup 24 detects the reflected light beam LR and supplies a light detecting signal according to the detection result to the signal processing unit 23.

The signal processing unit 23 performs various types of signal processes such as a predetermined demodulating process or a decoding process on the supplied light detecting signal to generate reproduced information and supplies the reproduced information to the controller 21. The controller 21 is configured to transmit the reproduced information to an external apparatus (not shown).

In this manner, the optical disc apparatus 20 controls the optical pickup 24 by the controller 21 to record information on the optical disc 100 and to reproduce information from the optical disc 100.

[1-3. Configuration of Optical Pickup]

Figure 7:
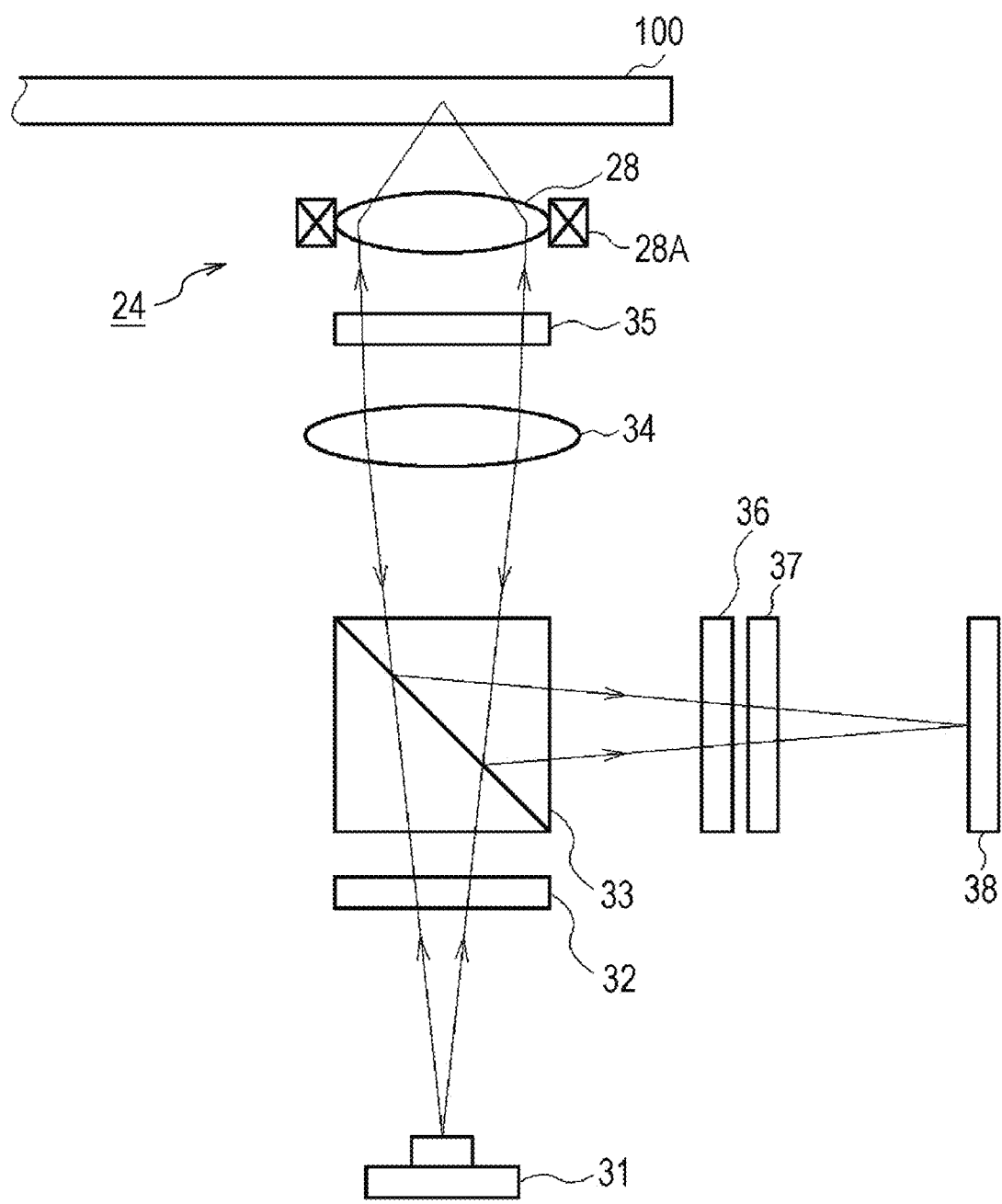
FIG. 7 is a schematic diagram illustrating a configuration of an optical pickup according to the first embodiment.

Next, a configuration of the optical pickup 24 is described. As illustrated in FIG. 7, the optical pickup 24 is constructed by assembling many optical parts.

[1-3-1. Whole Configuration of Optical Pickup]

The laser diode 31 emits the light beam L having a wavelength of about 405 [nm] based on the control of the controller 21 and the signal processing unit 23 (FIGS. 1A and 1B) to be incident on the grating 32.

In addition, an installation position, an installation angle, or the like of the laser diode 31 is adjusted so that the light beam L is P-polarized. In addition, due to general characteristics of the laser diode 31, the light intensity distribution of the light beam L is the so-called Gaussian distribution.

The grating 32 spectroscopically disperses the light beam L into a main beam and two sub beams to be incident on the polarizing beam splitter (PBS) 33 (herein, for the convenience, referred as a polarizing beam splitter). In addition, for the convenience of description, hereinafter, the main beam and the two sub beams are collectively referred to as a light beam L.

The polarizing beam splitter 33 is configured to reflect or transmit the light beam at a ratio according to the polarizing direction of the light beam by the polarization plane 33S. Actually, the polarizing beam splitter 33 transmits most portions of the P-polarization component of the incident light beam L to be incident on the collimator lens 34.

In addition, in the polarizing beam splitter 33, for example, the reflectance ratio and transmittance ratio of the P-polarization are set to about 10% and about 90%, respectively, and the reflectance ratio and transmittance ratio of the S-polarization are set to about 30% and about 70%. In this manner, the ratios in the transmission/reflection characteristics of the P-polarization and the S-polarization are appropriately adjusted, so that the influence of birefringence is not easily made by the optical disc 100.

The collimator lens 34 transforms the light beam L as a diverging light into a parallel light to be incident on the ¼ wavelength plate 35. The ¼ wavelength plate 35 is configured to mutually transform the light beam between linearly polarized light and circularly polarized light, so that the light beam L having P-polarization is transformed into, for example, left-handed circularly polarized light to be incident on the objective lens 28.

The objective lens 28 is configured to be moved in the focus direction and the tracking direction by an actuator 28A based on the control of the driving controller 22, that is, to be subject to the focusing control and the tracking control.

In addition, the focus direction denotes an approaching or separating direction on the optical disc 100 (that is, the up/down direction of FIG. 7), and the tracking direction denotes a direction directing toward the inner circumference side or the outer circumference side of the optical disc 100 (that is, the left/right direction of FIG. 7).

Figure 6:
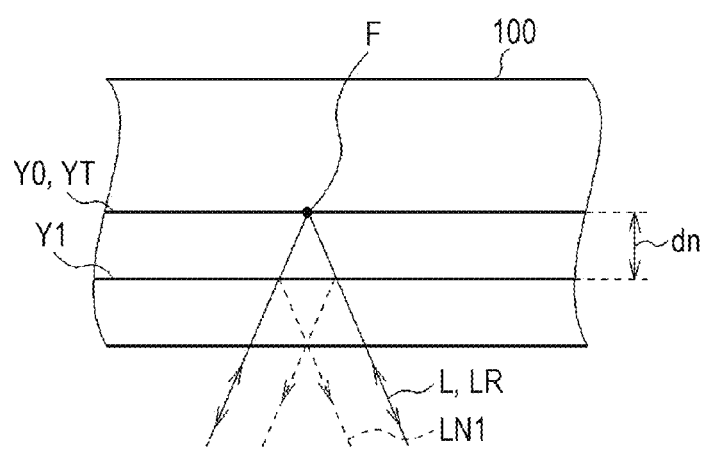
FIG. 6 is a schematic diagram illustrating a configuration of an optical disc and reflection of a light beam.

The objective lens 28 collects the light beam L to illuminate the optical disc 100. At this time, as illustrated in FIG. 6, the objective lens 28 aligns the focus F of the light beam L to the target recording layer YT (in this case, the recording layer Y0).

Figure 8:
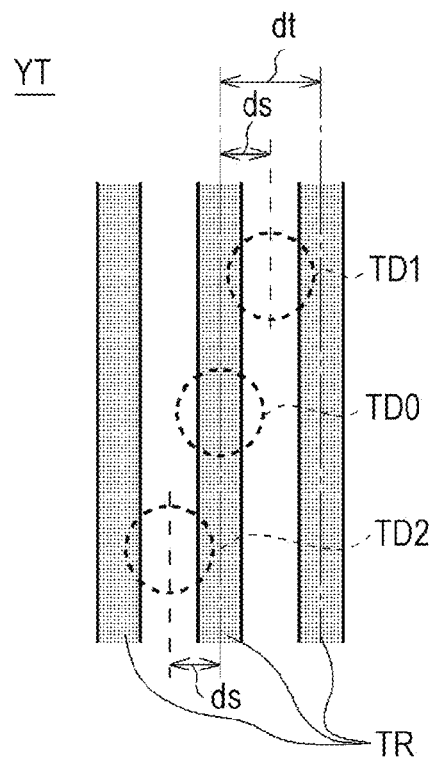
FIG. 8 is a schematic diagram illustrating formation of a beam spot in an optical disc.

At this time, as illustrated in FIG. 8, in the target recording layer YT of the optical disc 100, a spot TD0 by a main beam and spots TD1 and TD2 by a sub beam are formed.

The spots TD1 and TD2 are formed at positions, which are separated by a spot interval ds from the spot TD0 in the opposite directions, in the tracking direction. In the optical pickup 24, optical characteristics of the grating 32 and the like are adjusted so that the spot interval ds becomes ½ of the track pitch dt.

Each of the main beam and the two sub beams of the light beam L is partially reflected on the target recording layer YT. Hereinafter, the reflected main beam and two sub beams are collectively referred to as a reflected light beam LR. In addition, at the time of reflection, since the circling direction of the circularly polarized light of the reflected light beam LR is inverted, the reflected light beam LR becomes a right-handed circularly polarized light.

With respect to the reflected light beam LR, the diverging light is transformed into parallel light by the objective lens 28 (FIGS. 3A and 3B), the right-handed circularly polarized light is transformed to the S-polarization by the ¼ wavelength plate 35, and the resulting beam is transformed into convergent light by the collimator lens 34, which is incident on the polarizing beam splitter 33.

The polarizing beam splitter 33 reflects the reflected light beam LR having the S-polarization by using the polarization plane 33S to be incident on the lens 36. The lens 36 collects the reflected light beam LR to be incident on the hologram plate 37.

The hologram plate 37 performs the diffraction operation or the like on the reflected light beam LR to be split into a plurality of light beams and to illuminate the photodetector 38 with the light beams (described later in detail).

The photodetector 38 receives the illuminated reflected light beam LR by a plurality of light detecting areas to generate light detecting signals according to the received light amounts thereof and supplies the light detecting signals to the signal processing unit 23 (described later in detail).

The signal processing unit 23 performs calculation processes based on the light detecting signals to generate a focus error signal, a tracking error signal, and a reproducing RF signal (described later in detail).

[1-3-2. Configuration of Hologram Plate]

Figure 9:
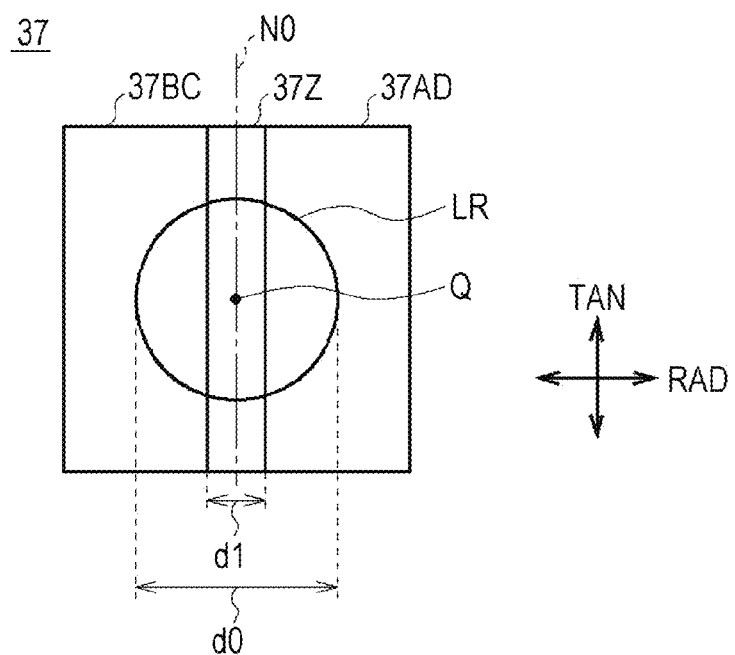
FIG. 9 is a schematic diagram illustrating a configuration of a hologram plate according to the first embodiment.

As illustrated in FIG. 9 corresponding to FIG. 3A, the hologram plate 37 is divided into three, that is, into a central area 37Z and areas 37AD and 37BC, which are remaining portions, in the radial direction, so that holograms having different diffraction directions are formed in the areas.

In FIG. 9, in an image of the reflected light beam LR, the tracking direction (that is, the tangential direction) of the tracks formed on the target recording layer YT of optical disc 100 is set to the vertical direction of the figure, and the inner circumference side and the outer circumference side are set to the left side and the right side of the figure, respectively.

Figure 10:
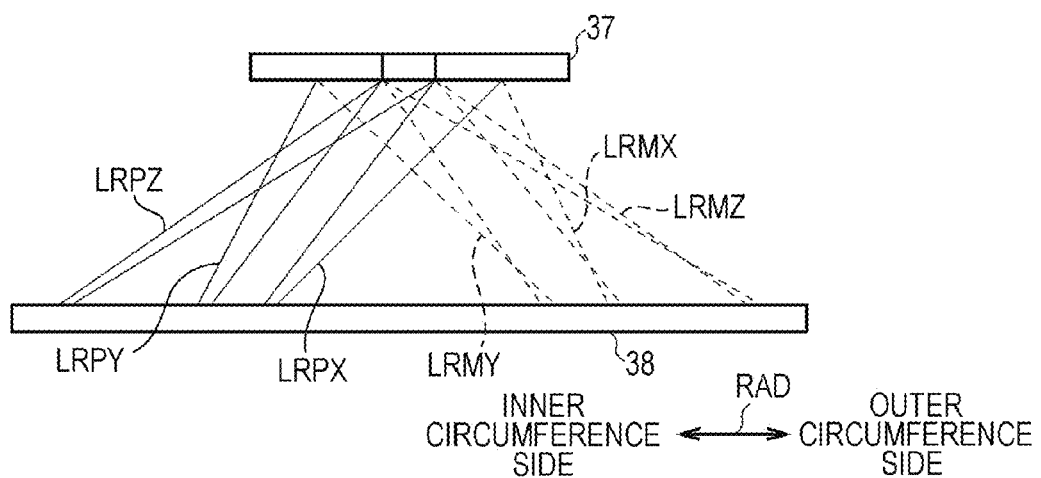
FIG. 10 is a schematic diagram illustrating diffraction and splitting of a light beam according to the first embodiment.

The area 37AD diffracts the portion of the reflected light beam LR, which is illuminated on the area 37AD, to generate the positive and negative reflected light beams LRPX and LRMX, each of which is a primary light, as illustrated in FIG. 10. At this time, the area 37AD diffracts the reflected light beam LRPX to the inner circumference side and diffracts the reflected light beam LRMX to the outer circumference side to illuminate the photodetector 38.

The area 37BC diffracts the portion of the reflected light beam LR, which is illuminated on the area 37BC, to generate the positive and negative reflected light beams LRPY and LRMY, each of which is a primary light, as illustrated in FIG. 10. At this time, the area 37BC diffracts the reflected light beam LRPY to the inner circumference side and diffracts the reflected light beam LRMY to the outer circumference side to illuminate the photodetector 38.

As a result, although all the reflected light beams LRPX and LRPY (hereinafter, collectively referred to as a positive reflected light beam LRP) are diffracted to the inner circumference side, the reflected light beams LRPX and LRPY propagate to be separated from each other in the radial direction. Similarly, although all the reflected light beams LRMX and LRMY (hereinafter, collectively referred to as a negative reflected light beam LRM) are diffracted to the outer circumference side, the reflected light beams LRMX and LRMY propagate to be separated from each other in the radial direction.

The area 37Z diffracts a portion of the reflected light beam LR, which is illuminated on the area 37Z, to generate the reflected light beams LRPZ and LRMZ having positive and negative primary light, respectively, as illustrated in FIG. 10. At this time, the area 37Z diffracts the reflected light beam LRPZ to the more inner circumference side than the reflected light beam LRPY and diffracts the reflected light beam LRMZ the more outer circumference side than the reflected light beam LRMX, to the photodetector 38, respectively.

Furthermore, in the areas 37AD and 37BC of the hologram plate 37, the focus of the positive reflected light beam LRP and the focus of the negative reflected light beam LRM are configured to be different from each other in order to correspond to the focusing control according to the SSD (Spot Size Detecting) method.

Figure 11A:
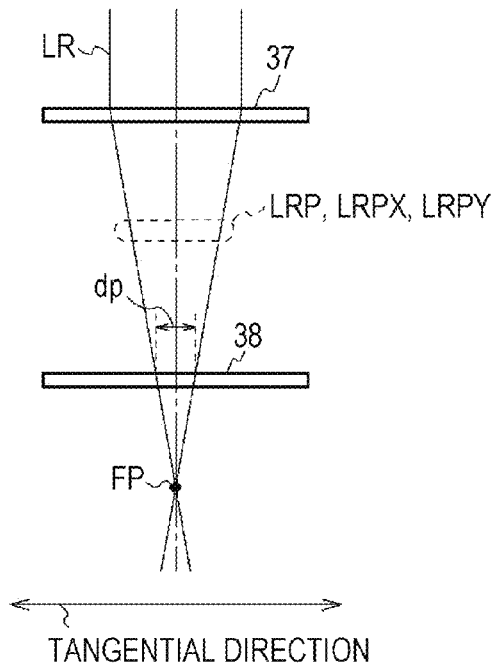
FIGS. 11A and 11B are schematic diagrams illustrating movement of a focus position by a hologram plate.

More specifically, as illustrated in FIG. 11A, the areas 37AD and 37BC form the focus FP of the positive reflected light beam LRP (LRPX and LRPY) in the tangential direction to the back side (the lower side of the figure) of the photodetector 38 by the operation of the formed hologram.

Figure 11B:
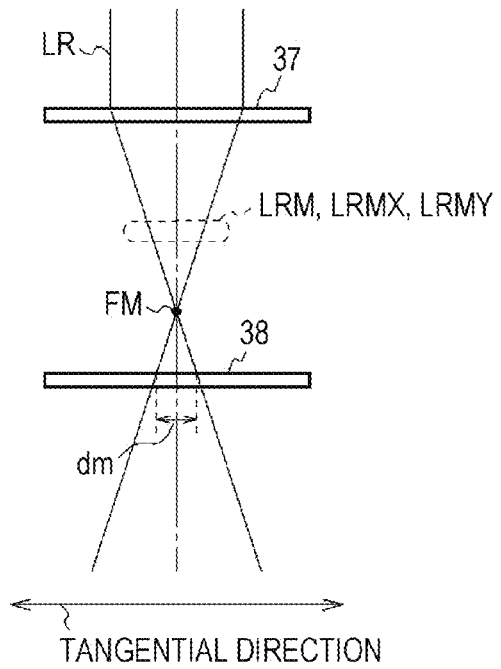

In addition, as illustrated in FIG. 11B, the areas 37AD and 37BC forms the focus FM of the negative reflected light beam LRM (LRMX and LRMY) in the tangential direction to the front side (the upper side of the figure) of the photodetector 38 by the operation of the formed hologram.

In addition, in the optical pickup 24, the characteristics, the installation positions, and the like of the optical parts are adjusted so that, when the focus F (FIG. 6) of the light beam L is aligned on the target recording layer YT, the lengths dp and dm of the spot, which is formed on the photodetector 38 by the positive reflected light beam LRP and the negative reflected light beam LRM, in the tangential direction are almost equal to each other.

In addition, the hologram plate 37 is configured so that, each of the main beam and the two sub beams of the reflected light beam LR is divided and diffracted in each area, and furthermore, the focus positions are designed to be different from each other.

In this manner, the hologram plate 37 is configured so that the reflected light beam LR is divided into three, that is, into the central portion and the peripheral portions in the radial direction to be separated from each other, and the reflected light beam LR is split into a plurality of reflected light beams LR to be propagated.

[1-3-3. Configuration of Photodetector]

[1-3-3-1. Configuration of Light detecting Area]

As illustrated in FIG. 12, in the photodetector 38, a plurality of light detecting area groups 38G1, 38G2, 38G3, 38G4, and 38G5 for receiving the reflected light beam LR are disposed.

On the photodetector 38, the beam spots T0PX and T0PY are formed by the main beams of the positive reflected light beams LRPX and LRPY, and each of the beam spots T1PX and T1PY and the beam spots T2PX and T2PY are formed by the two sub beams of the positive reflected light beams LRPX and LRPY.

In addition, on the photodetector 38, the beam spots T0MX and T0MY are formed by the main beams of the negative reflected light beams LRMX and LRMY. In addition, in the photodetector 38, although the beam spots generated from the two sub beams of each of the negative reflected light beams LRMX and LRMY are individually formed, the light amounts thereof are not particularly detected.

Furthermore, on the photodetector 38, the beam spot T0PZ is formed by the main beam of the positive reflected light beam LRPZ. In addition, in the photodetector 38, although the beam spots generated from the two sub beams of the positive reflected light beam LRPZ and the main beam and the two sub beams of the negative reflected light beam LRMZ, the light amounts thereof are not particularly detected in this example.

The light detecting area groups 38G1, 38G2, and 38G3 are disposed at the positions corresponding to the beam spots T0PX and T0PY, the beam spots T1PX and T1PY, and the beam spots T2PX and T2PY formed by the positive reflected light beams LRPX and LRPY.

In addition, each light detecting area group 38G1, 38G2, and 38G3 is divided into an inner circumference side and an outer circumference side in the radial direction, so that the light amounts of the beam spots T0PX and T0PY, T1PX and T1PY and T2PX and T2PY which are formed to be separated from each other in the radial direction may be independently detected.

The light detecting area group 38G1 is divided into two in the radial direction and divided into four in the tangential direction, so that the light detecting areas 38A1, 38A2, 38D2, and 38D1 of the outer circumference side and the light detecting areas 38B1, 38B2, 38C2, and 38C1 of the inner circumference side are disposed. Hereinafter, each of the light detecting areas of the light detecting area group 38G1 is referred to as a main light detecting area.

In addition, in comparison with the diagrammatic views of FIGS. 3A and 3B, in the photodetector 38, the light detecting areas 38A1 and 38A2 correspond to the light detecting area 38A, the light detecting areas 38B1 and 38B2 correspond to the light detecting area 38B, the light detecting areas 38C1 and 38C2 correspond to the light detecting area 38C, and the light detecting areas 38D1 and 38D2 correspond to the light detecting area 38D.

The light detecting areas 38A1, 38A2, 38D2, and 38D1 are illuminated with the beam spot T0PX by the main beam of the positive reflected light beam LRPX. In addition, the light detecting areas 38B1, 38B2, 38C2, and 38C1 are illuminated with the beam spot T0PY by the main beam of the positive reflected light beam LRPY.

In addition, each of the portions combining the light detecting areas 38A1 and 38B1, the portions combining the light detecting areas 38A2, 38D2, 38B2, and 38C2, and the portions combining the light detecting areas 38C1 and 38D1 are configured in the same shape as that of the case where division by three is performed at a predetermined ratio in the tangential direction.

The light detecting areas 38A1, 38A2, 38D2, and 38D1, and 38B1, 38B2, 38C2, and 38C1 generate the light detecting signals SA1, SA2, SD2, and SD1, and SB1, SB2, SC2, and SC1 according to the received light amounts thereof and supplies the light detecting signals SA1, SA2, SD2, and SD1, and SB1, SB2, SC2, and SC1 to the signal processing unit 23 (FIG. 5), respectively.

The light detecting area group 38G2 is divided into the light detecting area 38E1 of the outer circumference side and the light detecting area 38F1 of the inner circumference side. The beam spots T1PX and T1PY generated from the sub beams of the positive reflected light beams LRPX and LRPY are formed in the light detecting area 38E1 and the light detecting area 38F1, respectively.

The light detecting areas 38E1 and 38F1 generate the light detecting signals SE1 and SF1 according to the received light amounts thereof and supplies the light detecting signals SE1 and SF1 to the signal processing unit 23 (FIG. 5).

The light detecting area group 38G3 is divided into the light detecting area 38E2 of the outer circumference side and the light detecting area 38F2 of the inner circumference side. The beam spots T2PX and T2PY generated from the sub beams of the positive reflected light beams LRPX and LRPY are formed in the light detecting area 38E2 and the light detecting area 38F2, respectively.

The light detecting areas 38E2 and 38F2 generates light detecting signals SE2 and SF2 according to received light amounts thereof and supplies the light detecting signals SE2 and SF2 to the signal processing unit 23 (FIG. 5). Hereinafter, each of the light detecting areas of the light detecting area groups 38G2 and 38G3 is referred to as a sub light detecting area.

In the light detecting area group 38G4, the light detecting areas 38Z1 and 38Z2 are disposed to be adjacent to each other in the tangential direction. In the light detecting areas 38Z1 and light detecting area 38Z2, the beam spot T1PZ is formed by the main beam of the positive reflected light beam LRPZ.

The light detecting areas 38Z1 and 38Z2 generates light detecting signals SZ1 and SZ2 according to received light amounts thereof and supply the light detecting signals SZ1 and SZ2 to the signal processing unit 23 (FIG. 5).

The light detecting area group 38G5 is divided into three, that is, into light detecting areas 38M1, 38N, and 38M2 at the same division ratio as that of the light detecting area group 38G1 in the tangential direction. In the light detecting areas 38M1, 38N, and 38M2, beam spots T0MX and T0MY by the main beams of the negative reflected light beams LRMX and LRMY are formed.

The light detecting areas 38M1, 38N, and 38M2 generate light detecting signals SM1, SN, and SM2 according to received light amounts thereof and supply the light detecting signals SM1, SN, and SM2 to the signal processing unit 23 (FIG. 5).

In this manner, the photodetector 38 is configured so that a plurality of the light detecting areas generate the light detecting signals S according to the received light amounts thereof and supplies the light detecting signals S to the signal processing unit 23 (FIG. 5).

[1-3-3-2. Illumination of Other-Layer Stray Light]

However, in the optical disc 100 (FIG. 6), a portion of the light beam L is reflected on the recording layer Y1 different from the target recording layer YT, so that an other-layer stray light beam LN is generated.

The other-layer stray light beam LN follows the same optical path as that of the reflected light beam LR in the optical pickup 7, is diffracted at each area by the hologram plate 37, and after that, is illuminated on the photodetector 38.

Herein, since the other-layer stray light beam LN and the reflected light beam LR reflected by the target recording layer YT have different optical path lengths, the other-layer stray light beam LN is illuminated on the photodetector 38 in a defocused state, so that other-layer stray light patterns WPX, WPY, WPZ, WMX, WMY, and WMZ are formed to be spread in a relatively wide range.

In addition, on the photodetector 38, although other-layer stray light beam spots corresponding to the sub beams are also formed in principle, the light intensity thereof is weak and the influence thereof on each light detecting signal is very small. For this reason, in FIG. 12, only the other-layer stray light patterns WPX, WPY, WPZ, WMX, WMY, and WMZ (hereinafter, collectively referred to as other-layer stray light patterns W) corresponding to the main beams are illustrated.

In the optical pickup 24, the division pattern by the hologram plate 37, the diffraction direction and the diffraction angle, and the shape, the layout, or the like of each light detecting area in the photodetector 38 are designed so that the other-layer stray light pattern is not illuminated on the light detecting area, which generates the light detecting signal which is easily influenced by the other-layer stray light pattern W, if possible (described later in detail).

[1-4. Signal Process]

The signal processing unit 23 (FIG. 5) is configured to generate the focus error signal based on the SSD method and the tracking error signal and reproducing RF signal according to the DPP (Differential Push Pull) method or the DPD method from the light detecting signal.

First, the signal processing unit 23 calculates sub light detecting signals SE and SF as addition values of light detecting signals with respect to the inner circumference side and the outer circumference side of the sub light detecting area according to the following Equations (7) and (8).

[Equation 7]
$$SE = SE1 + SE2 \quad (7)$$

[Equation 8]
$$SF = SF1 + SF2 \quad (8)$$

In addition, the signal processing unit 23 generates the light detecting signals SA, SB, SC, and SD corresponding to the light reception results of the portions other than the central portion of the main beam according to the following Equations (9) to (12).

[Equation 9]
$$SA = SA1 + SA2 \quad (9)$$

[Equation 10]
$$SB = SB1 + SB2 \quad (10)$$

[Equation 11]
$$SC = SC1 + SC2 \quad (11)$$

[Equation 12]
$$SD = SD1 + SD2 \quad (12)$$

Herein, the light detecting signal SA becomes a value indicating the light amount of the one of two light beams obtained by dividing the reflected light beam LRPX into two in the tangential direction, that is, the light amount of the divided area 37A in FIG. 4B. Similarly, the light detecting signals SB, SC, and SD become values indicating the light amounts of the divided areas 37B, 37C, and 37D in FIG. 4B.

Subsequently, the signal processing unit 23 generates the central values SMA and SMB by adding ½ of the light detecting signal SZ1 to the light detecting signals SA and SB according to the aforementioned Equations (2) and (3) and generates the central values SMC and SMD by adding ½ of the light detecting signal SZ2 to the light detecting signals SC and SD according to the aforementioned Equations (4) and (5).

Herein, the signal processing unit 23 is configured to change methods of calculating the tracking error signal according to the type of the optical disc 100. For example, in the case of reproducing information from the optical disc 100 such as a DVD-ROM medium or a recorded DVD-R medium, the signal processing unit 23 calculates the tracking error signal by the DPD method.

More specifically, as described above, first, the signal processing unit 23 calculates phase signals φSMA, φSMB, φSMC, and φSMD indicating phases based on the central values SMA, SMB, SMC, and SMD.

Subsequently, the signal processing unit 23 calculates the tracking error signal STE according to the aforementioned Equations (6) and supplies the tracking error signal STE to the driving controller 22.

In addition, in the case of recording information in the optical disc 100, the signal processing unit 23 calculates the tracking error signal by the DPP method.

More specifically, the signal processing unit 23 calculates the tracking error signal STE by using the central values SMA, SMB, SMC, and SMD, the sub light detecting signals SE and SF, and a predetermined coefficient k according to the following Equation (13) and supplies the tracking error signal STE to the driving controller 22.

[Equation 13]
$$STE = \{(SMA + SMD) - (SMB + SMC)\} - k \cdot (SE - SF) \quad (13)$$

Furthermore, the signal processing unit 23 calculates the focus error signal by the SSD method. More specifically, the signal processing unit 23 calculates the focus error signal SFE by using the light detecting signals, which are obtained from the light detecting area groups 38G1 and 38G5 (FIG. 12) according to the following Equations (14) and supplies the focus error signal SFE to the driving controller 22.

[Equation 14]
$$SFE = (SA1 + SB1 + SC1 + SD1 + SN) - (SA2 + SB2 + SC2 + SD2 + SM1 + SM2) \quad (14)$$

Accordingly, the driving controller 22 controls the actuator 28A based on the focus error signal SFE and the tracking error signal STE to move the objective lens 28, so that the so-called servo control of aligning the focus F of the light beam L may be performed.

In addition, the signal processing unit 23 calculates the reproducing RF signal SRF based on the light detecting signals SA, SB, SC, and SD and the light detecting signals SZ1 and SZ2 according to the following Equation (15).

[Equation 15]
$$SRF = SA + SB + SC + SD + SZ1 + SZ2 \quad (15)$$

After that, the signal processing unit 23 reproduces the recorded information by performing a predetermined demodulating process, a decoding process, or the like on the reproducing RF signal SRF and supplies the reproduced information to the controller 21. The controller 21 transmits the reproduced information to an external apparatus (not shown).

In this manner, in the case of using the DPD method, the signal processing unit 23 generates the central values SMA to SMD by adding ½ times the central light detecting signal to each of the light detecting signals SA to SD and, after that, calculates the tracking error signal STE according to the aforementioned basic principle.

[1-5. Comparison with Optical Disc Apparatuses in the Related Art]

Next, the optical disc apparatus 20 according to the invention is compared with three types of optical disc apparatuses 50, 60, and 70 having the configurations in the related art.

[1-5-1. Comparison with Optical Disc Apparatus (1) in the Related Art]

The optical disc apparatus 50 (FIG. 5) in the related art is different from the optical disc apparatus 20 according to the invention in that the optical disc apparatus 50 includes a signal processing unit 53 and an optical pickup 54 instead of the signal processing unit 23 and the optical pickup 24. However, the other configurations are the same.

Figure 13A:
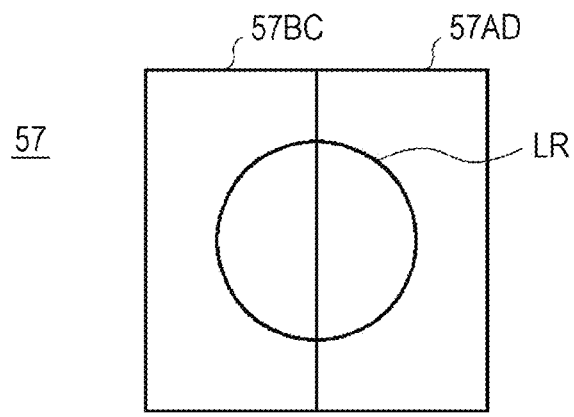
FIGS. 13A to 13C are schematic diagrams illustrating configurations of a hologram plate and a photodetector in an optical disc apparatus in the related art.
Figure 13B:
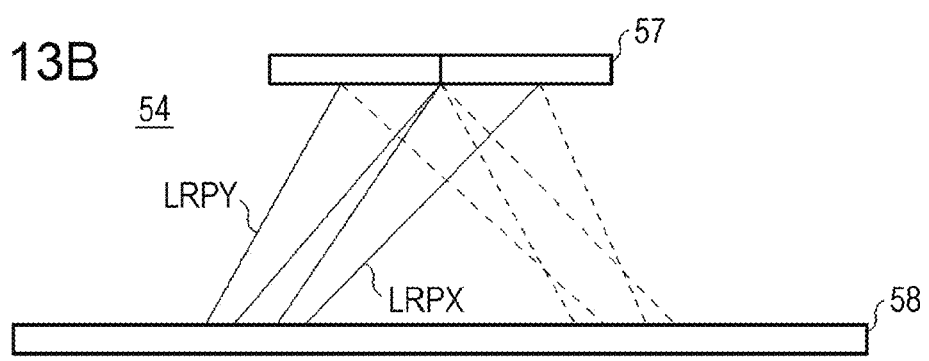
Figure 13C:
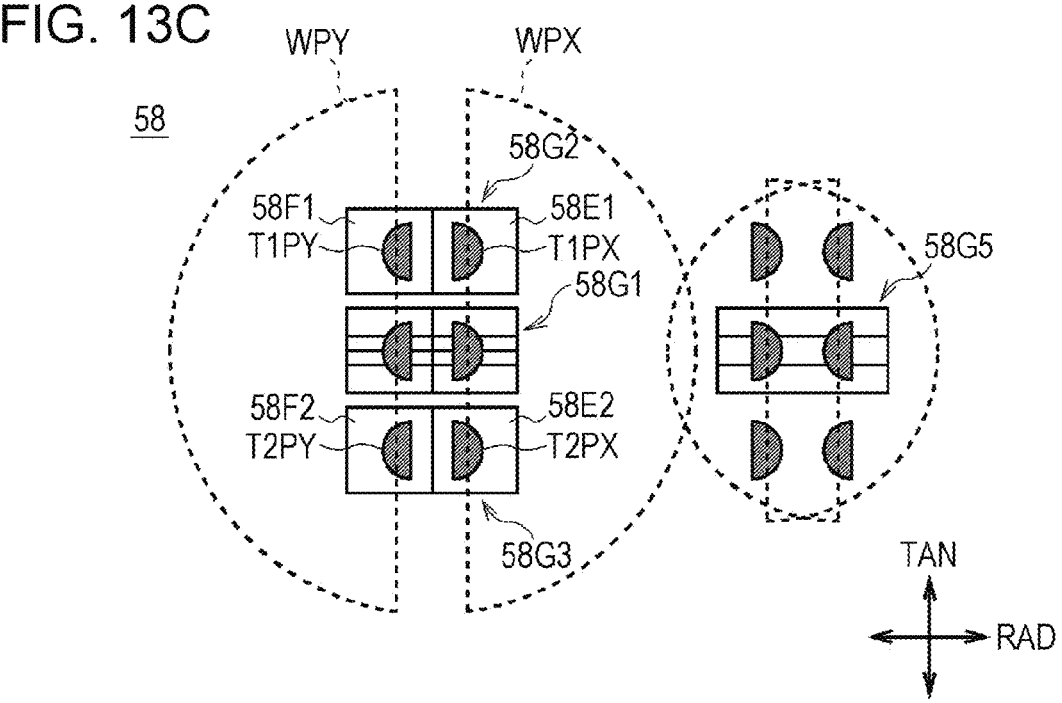

As illustrated in FIGS. 13A, 13B, and 13C corresponding to FIGS. 9, 10, and 12, the optical pickup 54 (FIG. 7) includes a hologram plate 57 and a photodetector 58 instead of the hologram plate 37 and the photodetector 38.

Similarly to the hologram plate 3 illustrated in FIG. 1, the hologram plate 57 is divided into two in the radial direction. In addition, the photodetector 58 has a configuration where the light detecting area group 38G4 in the photodetector 38 (FIG. 12) is omitted.

In the optical disc apparatus 50, since the hologram plate 57 is divided into two, the widths of the reflected light beams LRPX and LRPY in the radial direction are widened in comparison with the case of the optical disc apparatus 20 according to the invention.

Accordingly, in the photodetector 58 (FIG. 13C), the widths of the other-layer stray light patterns WPX and WPY in the radial direction are enlarged, so that a portion of each of the other-layer stray light patterns WPX and WPY intrudes into each of the light detecting areas 58E1, 58F1, 58E2, and 58F2, which are sub light detecting areas.

Herein, in general, in the optical disc apparatus using the DPP method, particularly, since energy is to be concentrated on a desired position when information is recorded on the optical disc, the ratio of the light amount of the main beam is configured to be increased, and the ratio of the light amount of the sub beam is configured to be relatively decreased.

As a result, on the photodetector 58, the light intensities of the other-layer stray light patterns WPX and WPY due to the main beam and the light intensities of the spots T1PX, T1PY, T2PX, and T2PY due to the sub beams are relatively close to each other in terms of value.

At this time, in the light detecting areas 58E1, 58F1, 58E2, and 58F2, since light interference occurs, it may not be possible to detect light amount accurately. As a result, in the signal processing unit 53, the quality of the tracking error signal is deteriorated, so that the accuracy of the tracking control may be deteriorated.

In addition, as illustrated in FIGS. 2A to 2C, in the optical disc apparatus 50, in the case where the lens shift occurs, since the phase changing ranges HA to HD intrude into the plurality of light detecting areas, the phase differences may not be correctly reflected in the tracking error signal.

However, in the optical disc apparatus 20 according to the invention, as illustrated in FIGS. 9, 10, and 12, the central portion of the reflected light beam LR in the radial direction is diffracted outwards. Therefore, in the optical pickup 24, the widths of the other-layer stray light patterns WPX and WPY in the radial direction may be able to be reduced, so that the other-layer stray light patterns WPX and WPY are prevented from intruding into the light detecting areas 38E1, 38F1, 38E2, and 38F2.

As a result, in the optical disc apparatus 20 according to the invention, the deterioration in the accuracy of the tracking control, which may occur in the optical disc apparatus 50 in the related art, may be able to be prevented in advance.

[1-5-2. Comparison with Optical Disc Apparatus (2) in the Related Art]

The optical disc apparatus 60 in the related art is different from the optical disc apparatus 20 according to the invention in that the optical disc apparatus 60 includes a signal processing unit 63 and an optical pickup 64 instead of the signal processing unit 23 and the optical pickup 24. However, the other configurations are the same.

Figure 14A:
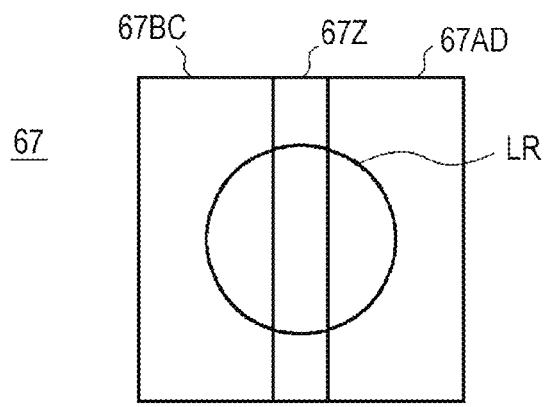
FIGS. 14A to 14C are schematic diagrams illustrating configurations of a hologram plate and a photodetector in an optical disc apparatus in the related art.
Figure 14B:
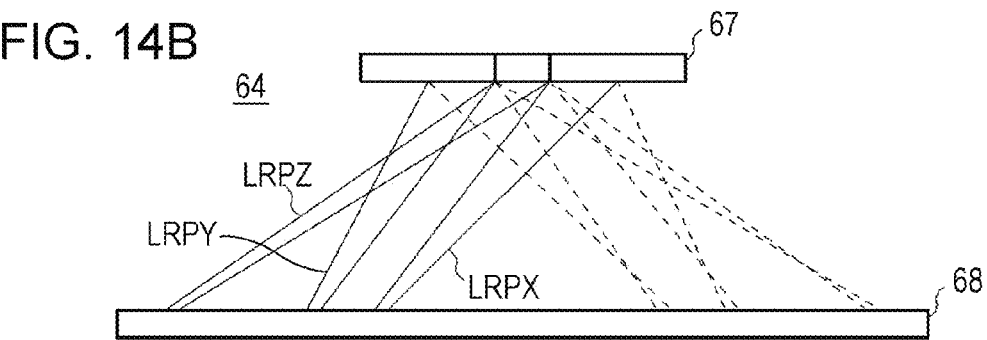
Figure 14C:
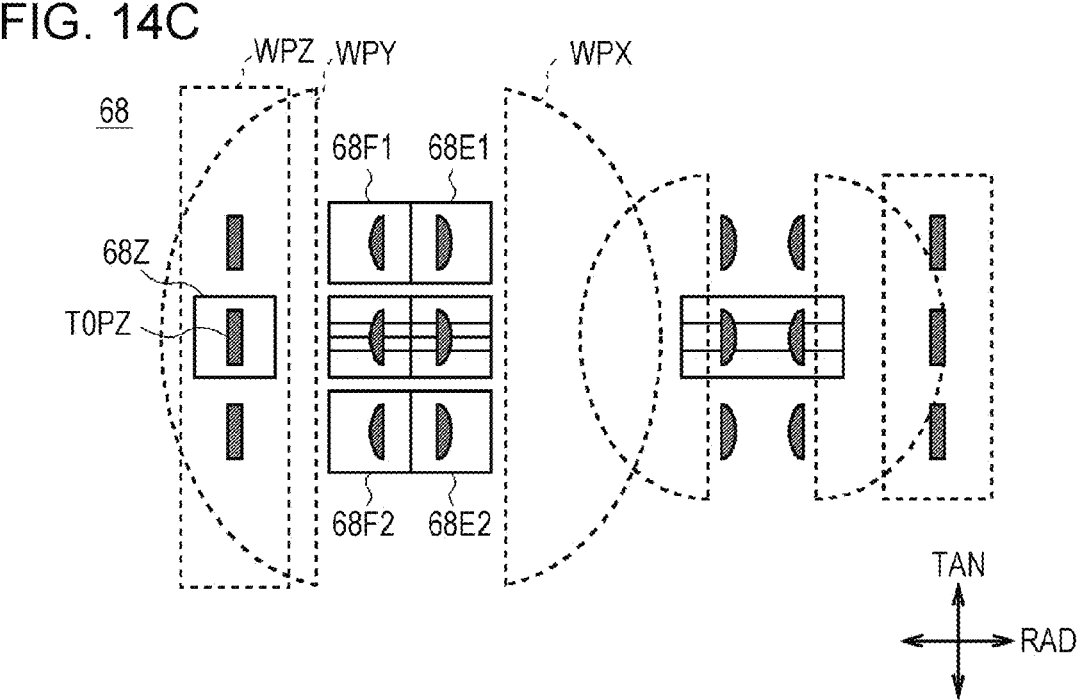

As illustrated in FIGS. 14A, 14B, and 14C corresponding to FIGS. 9, 10, and 12, the optical pickup 64 includes a hologram plate 67 and a photodetector 68 instead of the hologram plate 37 and the photodetector 38.

Figure 15A:
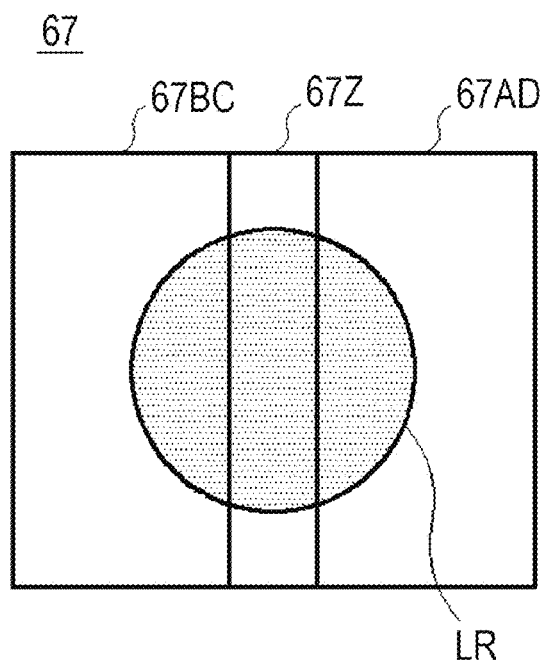
FIGS. 15A and 15B are schematic diagrams illustrating spot dividing light reception in the related art.

As illustrated in FIG. 15A corresponding to FIG. 3A, similarly to the hologram plate 37 (FIG. 10), the hologram plate 67 is divided into three, that is, into areas 67AD, 67BC, and 67Z in the radial direction. In addition, the holograms are formed in the areas 67AD, 67BC, and 67Z of the hologram plate 67 similarly to the areas 37AD, 37BC, and 37Z of the hologram plate 37.

Figure 15B:
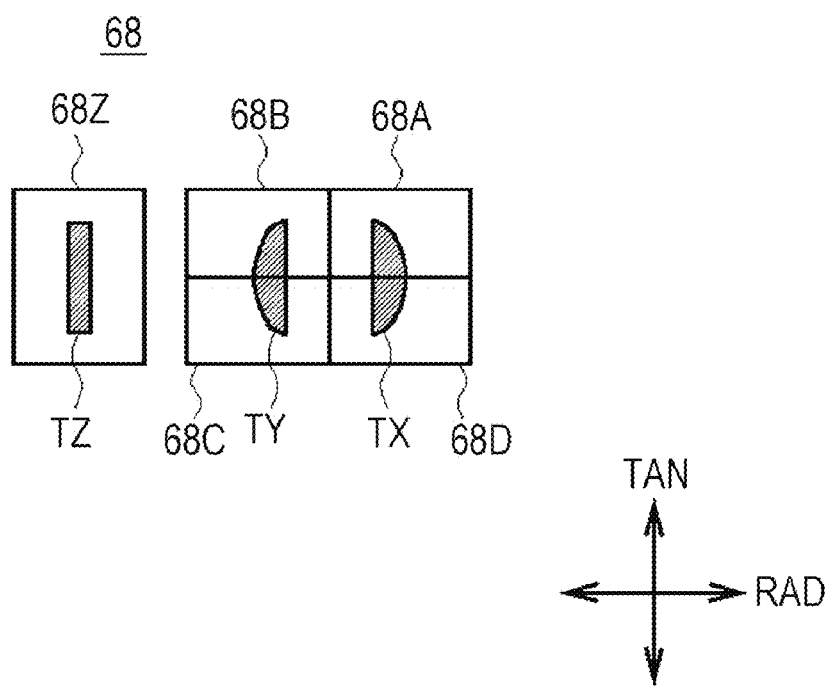

As diagrammatically illustrated in FIG. 15B corresponding to FIG. 3B, in the photodetector 68, light detecting area 68Z instead of the light detecting areas 38Z1 and 38Z2 in addition to light detecting areas 68A and 68D corresponding to the light detecting areas 38A to 38D are disposed.

As illustrated in FIG. 14C, the actual photodetector 68 has a configuration where the light detecting area 68Z is added in addition to the configuration of FIG. 13C. The light detecting area 68Z is configured to receive the spot T0PZ to generate the light detecting signal SZ.

Due to such a configuration, in the optical disc apparatus 60, As illustrated in FIG. 14C, the other-layer stray light patterns WPX and WPY are not allowed to be illuminated on the light detecting areas 68E1, 68F1, 68E2, and 68F2, which are sub light detecting areas, on the photodetector 68.

On the other hand, as illustrated in FIGS. 16A to 16C corresponding to FIGS. 4A to 4C, in the optical disc apparatus 60, even in the case where the lens shift does not occur, a portion of each of the phase changing ranges HA to HD intrudes into the divided area 67Z.

Particularly, in FIG. 16A illustrating the state where the lens shift occurs, most portions of the phase changing ranges HA and HD are included in the divided area 67Z, and in FIG. 16C, most portions of the phase changing ranges HB and HC are included in the divided area 67Z.

However, in the case of generating the tracking error signal by using the DPD method, the signal processing unit 63 of the optical disc apparatus 60 generates the signal by using only the light detecting signals SA to SD corresponding to the divided areas 67A to 67D according to Equation (1) without the use of the light detecting signal SZ corresponding to the divided area 67Z. In other words, among the phase changing ranges HA to HD, the portions included in the divided area 67Z are excluded from the tracking error signal.

For this reason, in the optical disc apparatus 60, since the phase difference is not correctly reflected in the tracking error signal generated by the DPD method, the accuracy of the tracking control may be deteriorated.

However, in the optical disc apparatus 20 according to the invention, the signal processing unit 23 generates the tracking error signal STE by the DPD method by using the central values SMA to SMD, which are obtained by adding a product of ½ and the light detecting signals SZ1 and SZ2 to the light detecting signals SA to SD, according to the Equation (6).

For this reason, in the optical disc apparatus 20, the portions of the phase changing ranges HA to HD, which are included in the divided areas 37Z1 and 37Z2 (FIGS. 4A to 4C), may also be included in the tracking error signal. Therefore, even in the case where the lens shift occurs, it is possible to perform the tracking control which the phase differences are appropriately reflected on.

[1-5-3. Comparison with Optical Disc Apparatus (3) in the Related Art]

The optical disc apparatus 70 in the related art is different from the optical disc apparatus 20 according to the invention in that the optical disc apparatus 70 includes a signal processing unit 73 and an optical pickup 74 instead of the signal processing unit 23 and the optical pickup 24. However, the other configurations are the same.

Figure 17A:
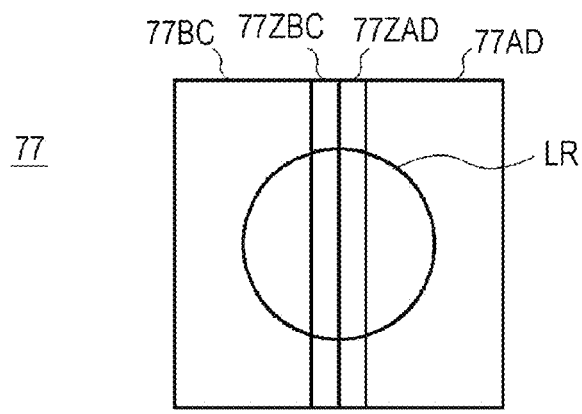
FIGS. 17A to 17C are schematic diagrams illustrating configurations of a hologram plate and a photodetector in an optical disc apparatus in the related art.
Figure 17B:
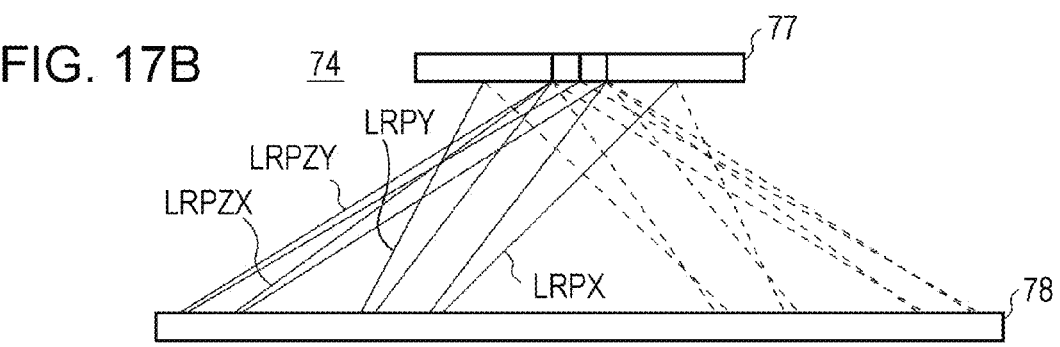
Figure 17C:
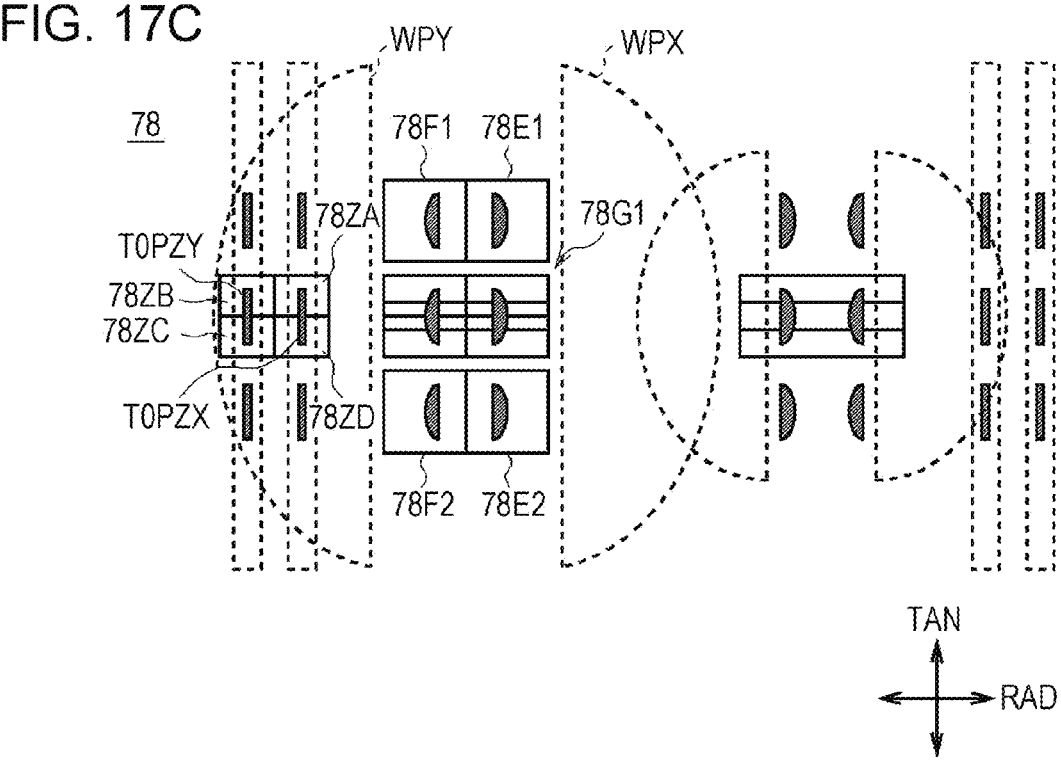

As illustrated in FIGS. 17A, 17B, and 17C corresponding to FIG. 9, FIG. 10, and FIG. 12, the optical pickup 74 includes a hologram plate 77 and a photodetector 78 instead of the hologram plate 37 and the photodetector 38.

As illustrated in FIG. 18A corresponding to FIG. 15A, the hologram plate 77 includes areas 77AD and 77BC similar to the areas 67AD and 67BC and areas 77ZAD and 77ZBC which are configured by further dividing a portion corresponding to the area 67Z into two in the radial direction.

The holograms are formed in the areas 77AD and 77BC of the hologram plate 77 similarly to the areas 67AD and 67BC of the hologram plate 67. In addition, a hologram of which the diffraction angle is slightly smaller than that of the area 67Z is formed in the area 77ZAD, and a hologram of which the diffraction angle is slightly larger than that of the area 67Z is formed in the area 77ZBC.

As diagrammatically illustrated in FIG. 18B corresponding to FIG. 15B, in the photodetector 78, light detecting areas 78ZA, 78ZB, 78ZC, and 78ZD instead of the light detecting area 68Z in addition to light detecting areas 78A to 78D corresponding to the light detecting areas 68A and 68D are disposed.

As illustrated in FIG. 17C, the actual photodetector 78 has a configuration where the light detecting areas 78ZA, 78ZB, 78ZC, and 78ZD are disposed instead of the light detecting area 68Z in the configuration of FIG. 14C.

The light detecting areas 78ZA and 78ZD receive the spot T0PZX to generate the light detecting signals SZA and SZD, respectively, and the light detecting areas 78ZB and 78ZC receive the spot T0PZY to generate the light detecting signals SZB and SZC, respectively.

In other words, in the optical disc apparatus 70, one light detecting signal SZ in the optical disc apparatus 60 is divided into four to set light detecting signals SZA to SZD. In addition, similarly to each of the light detecting areas of the light detecting area group 38G1 according to the invention, each of the light detecting areas of the light detecting area group 78G1 generates each of the light detecting signals SA1, SA2, SB1, SB2, SC1, SC2, SD1, and SD2.

Therefore, similarly to the photodetector 68 (FIG. 14C), in the photodetector 78 (FIG. 17C), illumination of the other-layer stray light patterns WPX and WPY on the sub light detecting area (light detecting areas 78E1, 78F1, 78E2, and 78F2) may be prevented.

The signal processing unit 73 calculates the light detecting signals SA to SD through the calculation expressed by the following Equations (16) to (19).

[Equation 16]

$$SA = SA1 + SA2 + SZA \tag{16}$$

[Equation 17]

$$SB = SB1 + SB2 + SZB \tag{17}$$

[Equation 18]

$$SC = SC1 + SC2 + SZC \tag{18}$$

[Equation 19]

$$SD = SD1 + SD2 + SZD \tag{19}$$

In this manner, the calculated light detecting signals SA to SD are equivalent to the light detecting signals SA to SD of the optical disc apparatus 50 in the related art.

For this reason, the signal processing unit 73 of the optical disc apparatus 70 may be able to generate the same tracking error signal as that of the signal processing unit 53 of the optical disc apparatus 50.

In other words, in the optical disc apparatus 70, as illustrated in FIGS. 19A to 19C corresponding to FIGS. 2A to 2C and FIGS. 16A to 16C, although portions of the phase changing ranges HA to HD intrude into the divided areas 77ZA, 77ZB, 77ZC, and 77ZD, the portions may be reflected on the tracking error signal by the calculations of Equations (16) to (19).

However, in the optical disc apparatus 70, in the case where the lens shift occurs (FIG. 19A), for example, the phase changing range HA is included in the divided area 77ZB, so that a portion of the component of the phase changing range HA is included in the light detecting signal SB. For this reason, similarly to the case of the optical disc apparatus 50, in the optical disc apparatus 70, the phase difference may not yet be appropriately reflected on the tracking error signal.

However, in the photodetector 78, the light detecting signal is amplified by using an amplifier in each light detecting area to be transmitted to the signal processing unit 73. However, at the time of amplification, noise components (amplification noise) are superimposed.

Particularly, in the optical disc apparatus 70, in comparison with the cases of the optical disc apparatuses 50 and 60, the number of light detecting areas used until the reproducing RF signal is finally obtained, that is, the number of light detecting signals is greatly increased. More specifically, in the optical disc apparatus 70, the signal processing unit 73 calculates the reproducing RF signal SRF according to the following Equation (20).

[Equation 20]

$$SRF = SA + SB + SC + SD + SZA + SZB + SZC + SZD \tag{20}$$

For this reason, in the optical disc apparatus 70, the C/N (Carrier/Noise) ratio in the reproducing RF signal generated by the signal processing unit 73 is deteriorated, so that a deterioration in the quality of the reproduced signal (so-called jitter-deterioration) may occur.

In addition, for the same reason, in the optical disc apparatus 70, similarly, the C/N ratio in the tracking error signal STE generated by the signal processing unit 73 is also deteriorated, so that deterioration in the accuracy of the tracking control may occur.

However, as expressed in Equations (2) to (5), in the optical disc apparatus 20 according to the invention, since the signal processing unit 23 adds the ½ times each of the light detecting signals SZ1 and SZ2 to each of the light detecting signals SA to SD, the influence of the amplification noise is reduced in comparison with the optical disc apparatus 70.

As a result, in the optical disc apparatus 20, it is possible to improve the quality of the tracking error signal in comparison with the optical disc apparatus 70, so that it is possible to improve the accuracy of the tracking control.

In addition, in the optical disc apparatus 20, since the signal processing unit 23 calculates the reproducing RF signal SRF according to Equation (15), it is possible to reduce the number of light detecting signals that are to be added in comparison with the case of the optical disc apparatus 70. Therefore, it is also possible to reduce the influence of amplification noise to the reproducing RF signal SRF.

In this manner, in the optical disc apparatus 20 according to the invention, various problems which may occur in the optical disc apparatuses 50, 60, and 70 in the related art are solved, so that it is possible to improve the accuracy of the tracking control by improving the quality of the tracking error signal.

[1-6. Relationship Between Lens Shift and Tracking Error Signal]

Next, in the case where the lens shift occurs in the optical pickup 27, a relationship between the phase changing ranges HA to HD of the reflected light beam and the divided areas (FIGS. 4A to 4C) of the hologram plate 37 is described particularly with reference to division lines N0, N1, and N2 in the radial direction.

Referring to the division lines of the divided areas in the radial direction, in the optical disc apparatus in the related art, since the portion of the phase changing range HA which exceeds the division line N0, for example, in FIG. 2A due to the lens shift is included the light detecting signal SB, the phase component may not appropriately used.

However, in the invention, since even the portion of the phase changing range HA which exceeds the division line N0 in FIG. 4A is included in the divided area Z1 if it does not exceeds the division line N2, the phase component may be appropriately used by adding the light detecting signal SZ1 to the light detecting signal SA.

In other words, in the configuration according to the invention, even in the case where the lens shift occurs with a relatively large movement distance, it is considered that an appropriate tracking error signal on which the phase component is reflected may be able to be generated.

Therefore, simulation of a relationship between a deviation amount (hereinafter, referred to as a detrack amount) from a desired track to the focus F (FIGS. 2A to 2C) of the light beam L in the tracking direction on the optical disc 100 and the tracking error signal STE which is obtained according to the DPD method is performed under various conditions.

In addition, in the following simulation, values of the tracking error signal STE, which are obtained when the lens shift (LS) amount of the objective lens 28 is set to 0, 0.4, 0.6, 0.7, or 0.8 [mm], are plotted on graphs. In addition, in the following simulation, in each case where the pit height of the optical disc 100 is $\lambda/4$ ($\lambda$, is a wavelength of the light beam L) which is the standard value of the DVD type and the case where the pit height is $\lambda/6$ which deviates from the standard value, the tracking error signal STE is calculated.

[1-6-1. Comparison with Optical Disc Apparatus in the Related Art]

First, in the optical disc apparatus 50 (FIGS. 13A to 13C) in the related art, in the case where the optical disc 100 of which the pit height is $\lambda/4$ or $\lambda/6$ is used, the graphs are obtained as illustrated in FIGS. 20A and 20B.

In addition, these graphs represent that, as the range (for example, the range where the detrack amount is ±0.2 [μm] or less) in the vicinity of the center of a view field in the characteristic curve is close to the diagonally-right-up straight line passing the origin (that is, the coordinate (0, 0)), it is possible to increase the accuracy of the tracking control, and as the range deviates from the diagonally-right-up straight line passing the origin, the accuracy of the tracking control is decreased.

It may be understood from FIG. 20A that, in the case where the optical disc 100 complies with the standard, as the lens shift amount is increased, the tracking error signal STE deviates from the standard characteristic (the characteristic when the lens shift amount is 0 [mm]).

In addition, referring to FIG. 20B, in the case where the optical disc 100 does not comply with the standard, when the lens shift amount is increased, the characteristic of the tracking error signal STE greatly deviates from the standard characteristic. Particularly, in the case where the lens shift amount is equal to or larger than 0.6 [mm], when the detrack amount is 0 [μm], the so-called offset occurs, where the tracking error signal STE becomes a value other than "0", so that the amount of the occurrence thereof becomes relatively large.

Next, in the optical disc apparatus 60 (FIGS. 14A to 16C) in the related art, in the case where the optical disc 100 of which the pit height is $\lambda/4$ or $\lambda/6$ is used, the graphs are obtained as illustrated in FIGS. 20C and 20D.

Referring to FIG. 20C, in the case where the pit height of the optical disc 100 is $\lambda/4$, when the lens shift amount is greatly increased up to 0.7 [mm] or more, a degree of deviation from a diagonally-right-up straight line passing the origin is increased in comparison with the case of the optical disc apparatus 50 (FIG. 20A) in the related art, and when the lens shift amount is 0.8 [mm], the characteristic curve is greatly broken down in the height direction, so that the characteristic curve is almost flattened.

In addition, referring to FIG. 20D, in the case where the pit height of the optical disc 100 is $\lambda/6$, when the lens shift amount is also greatly increased up to 0.7 [mm] or more, a degree of deviation from a diagonally-right-up straight line passing the origin is increased in comparison with the case of the optical disc apparatus 50 (FIG. 20B) in the related art, and when the lens shift amount is 0.8 [mm], the offset state is maintained.

Figure 21A:
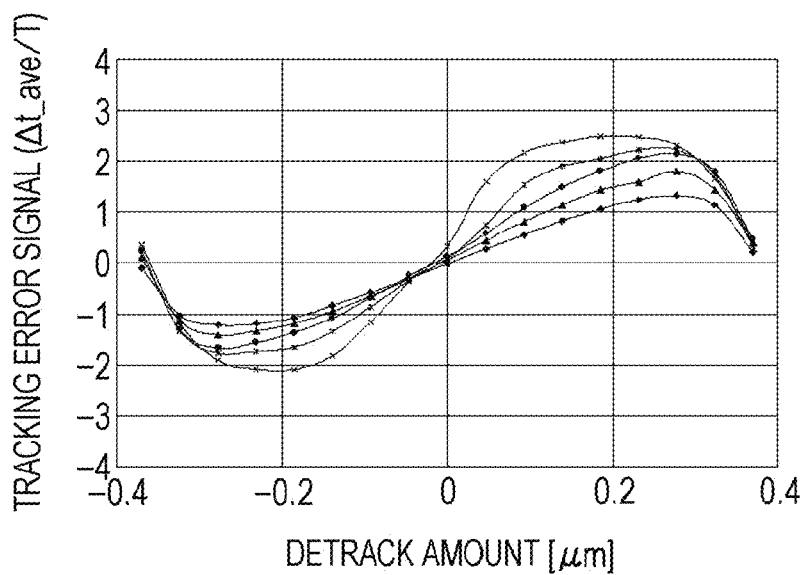
FIGS. 21A and 21B are schematic diagrams illustrating a relationship between a detrack amount and a tracking error signal.
Figure 21B:
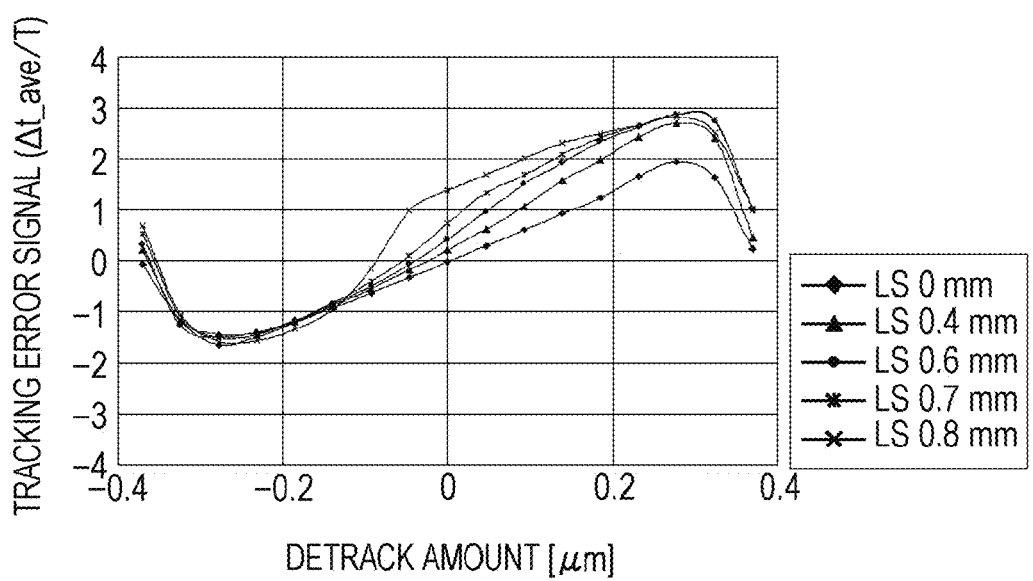

On the other hand, in the optical disc apparatus 20 according to the invention, in each of the case where the pit height of the optical disc 100 is $\lambda/4$, which is the standard value, and the case where the pit height is $\lambda/6$, which deviates from the standard value, the graphs are obtained as illustrated in FIGS. 21A and 21B.

Referring to FIG. 21A, in the case where the pit height of the optical disc 100 is $\lambda/4$, in comparison with the optical disc apparatus 50 (FIG. 20A) in the related art, even when the lens shift amount is greatly increased up to 0.7 [mm] or more, it may be understood that a relationship close to the diagonally-right-up straight line passing the origin is well maintained.

In addition, Referring to FIG. 21B, in the case where the pit height of the optical disc 100 is $\lambda/6$, in comparison with the optical disc apparatus 50 (FIG. 20B) in the related art, even when the lens shift amount is greatly increased up to 0.7 [mm] or more, the relationship close to the diagonally-right-up straight line passing the origin is well maintained, so that an amount of the occurring offset is also suppressed to be small. In addition, it may be understood that the amount of the occurring offset of the time when the lens shift amount is, for example, 0.8 [mm], that is, the value of the tracking error signal STE of the time when the detrack amount is 0 [μm] is also decreased.

Accordingly, in the optical disc apparatus 20 according to the invention, in comparison with the optical disc apparatus 50 in the related art even in the case where the lens shift amount is increased, it is possible to maintain a good quality of the tracking error signal STE, so that it is possible to increase the allowable value (margin) of the lens shift.

In addition, in the optical disc apparatus 20 according to the invention, in any one of the case where the pit height of the optical disc 100 is $\lambda/4$, which is the standard value, and the case where the pit height is $\lambda/6$, which deviates from the standard value, even in the case where the lens shift amount is increased, it is possible to maintain a good quality of the tracking error signal STE.

[1-6-2. Relationship Between Width of Central Area and Tracking Error Signal]

Next, in the case where the width d1 of the central area 37Z in the radial direction on the hologram plate 37 (FIG. 9) is changed, simulation of a relationship between the detrack amount and the tracking error signal STE according to the DPD method is performed under various conditions.

Hereinafter, the illumination width (that is, the beam diameter) of the reflected light beam LR in the radial direction on the hologram plate 37 is defined as d0. In the case where the ratio of the width d1 to the width d0 (hereinafter, referred to as a central width ratio) is set to 0, 17.5, 27.5, and 50 [%], the simulation is performed.

In addition, the case where the central width ratio is set to 0 [%] is the same as the case where the optical disc apparatus 50 (FIGS. 13A to 13C) in the related art is used.

In addition, hereinafter, for comparison, in the optical disc apparatus 60 in the related art, in the case where the width of the central area 67Z in the radial direction on the hologram plate 67 (FIG. 14A) is similarly changed, the simulation is performed.

In addition, in this simulation, in each of the case where the pit height of the optical disc 100 is $\lambda/4$ and the case where the pit height is $\lambda/6$, values of the tracking error signal STE, which are obtained when the lens shift (LS) amount of the objective lens 28 is set to 0, 0.4, 0.6, 0.7, or 0.8 [mm], are plotted on graphs.

Figure 22A:
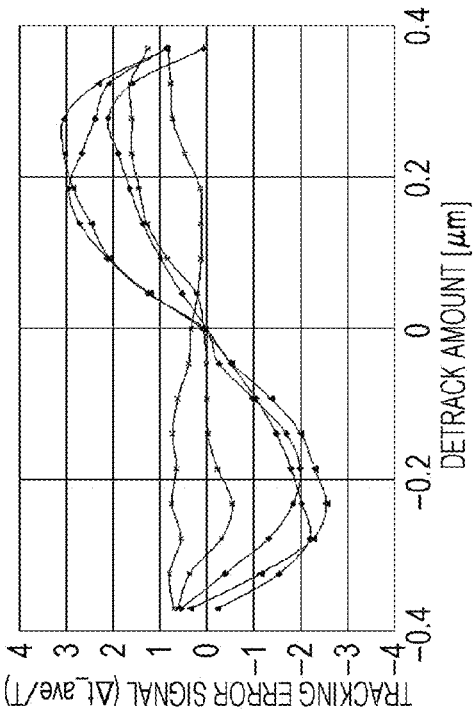
FIGS. 22A to 22D are schematic diagrams illustrating a relationship between a detrack amount and a tracking error signal when an optical disc having a pit height of $\lambda/4$ is used for an optical disc apparatus in the related art.
Figure 22C:
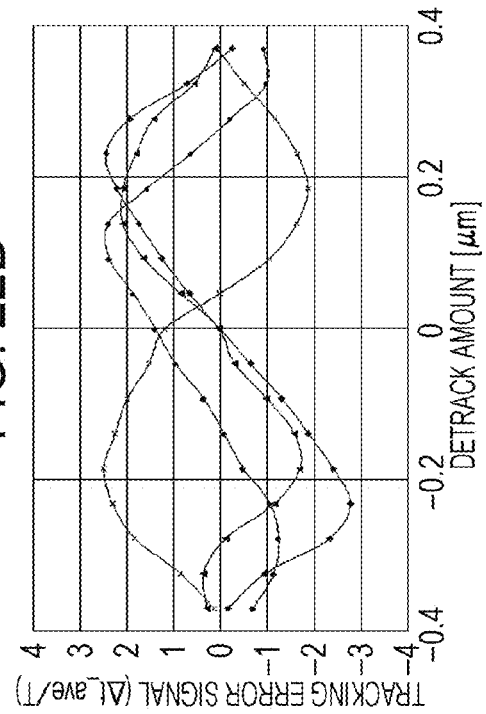
Figure 22B:
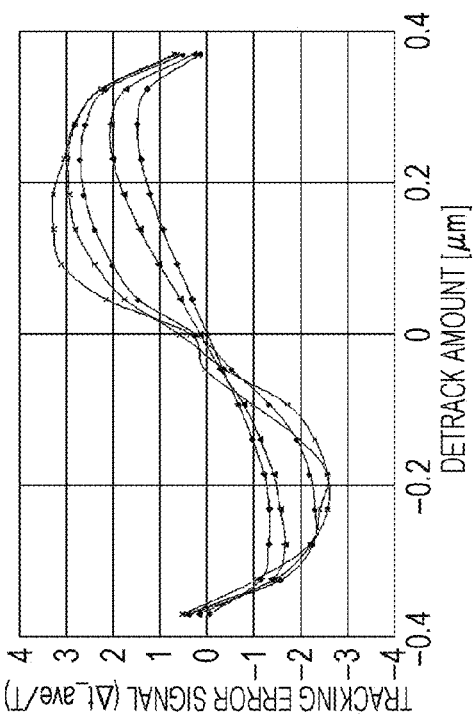
Figure 22D:
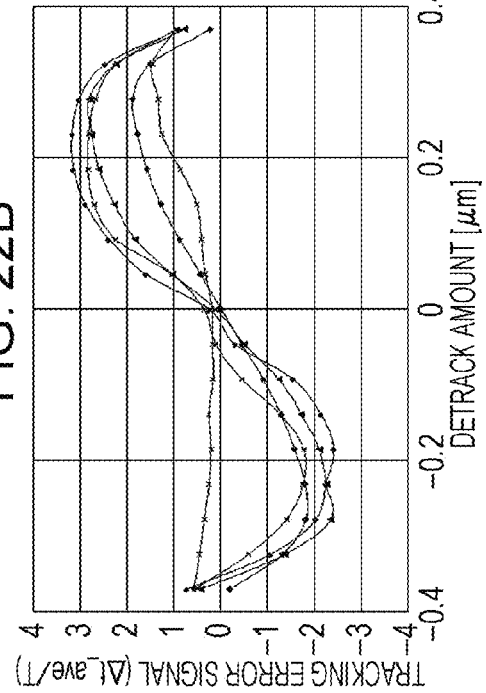

First, in the optical disc apparatus 60 (FIGS. 14A to 14C) in the related art, in the case where the optical disc 100 of which the pit height is $\lambda/4$ is used and the central width ratio is set to 0, 17.5, 27.5, and 50 [%], the graphs are obtained as illustrated in FIGS. 22A, 22B, 22C, and 22D. In addition, FIGS. 22A and 22B illustrate the same graphs as those of FIGS. 20A and 20C again for comparison.

Comparing with FIGS. 22A to 22D, it may be understood that, as the central width ratio is increased, then the degree of deviation of the tracking error signal STE from the standard characteristic (the characteristic when the lens shift amount is 0 [mm]) is also increased.

Next, in the optical disc apparatus 60 (FIGS. 14A to 14C) in the related art, in the case where the optical disc 100 of which the pit height is $\lambda/6$ is used and the central width ratio is set to 0, 17.5, 27.5, and 50 [%], the graphs are obtained as illustrated in FIGS. 23A, 23B, 23C, and 23D. In addition, FIGS. 23A and 23B illustrate the same graphs as those of FIGS. 20B and 20D again for comparison.

By comparing FIGS. 23A to 23D, it may be understood that the more the central width ratio is increased, the higher the degree of the deviation of the tracking error signal STE from the standard characteristic is increased. Particularly, in the case where the central width ratio is 50 [%] (FIG. 23D), if the lens shift amount is equal to or larger than 0.2 [mm], the offset occurs in every case, so that the accuracy of the tracking control is greatly deteriorated.

Figure 24A:
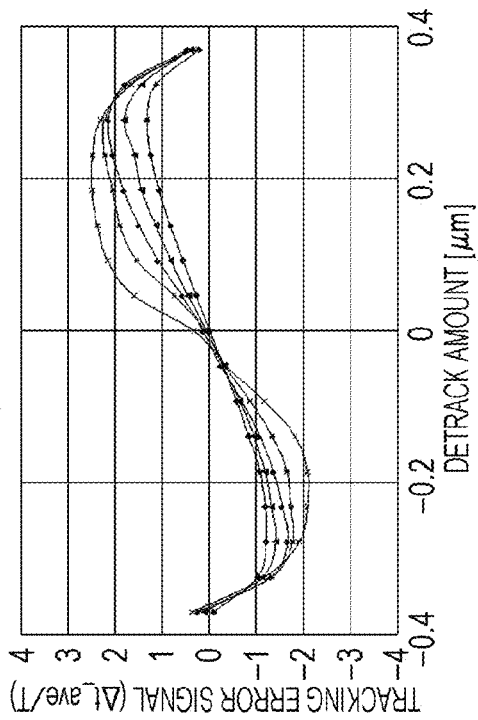
FIGS. 24A to 24D are schematic diagrams illustrating a relationship between a detrack amount and a tracking error signal when an optical disc having a pit height of $\lambda/4$ is used for an optical disc apparatus according to the invention.
Figure 24B:
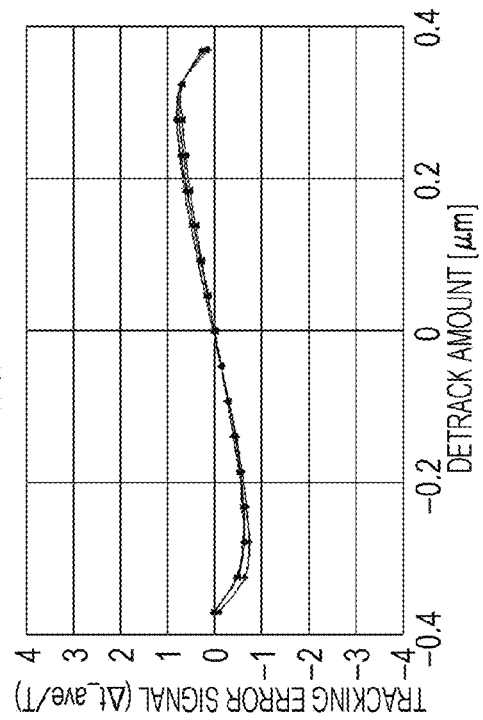
Figure 24C:
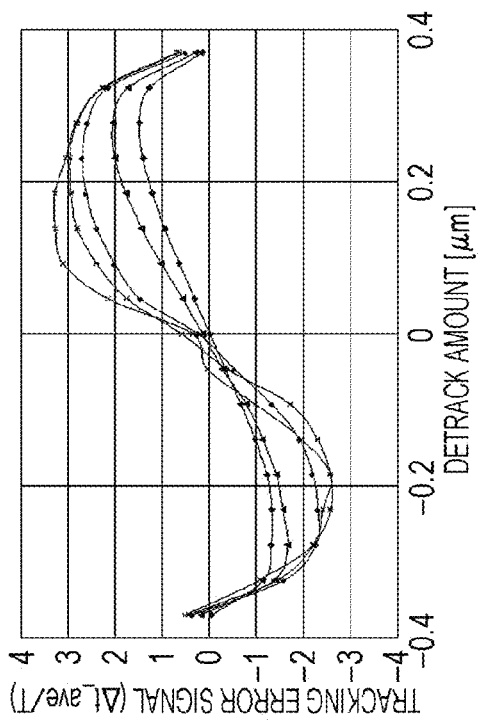
Figure 24D:
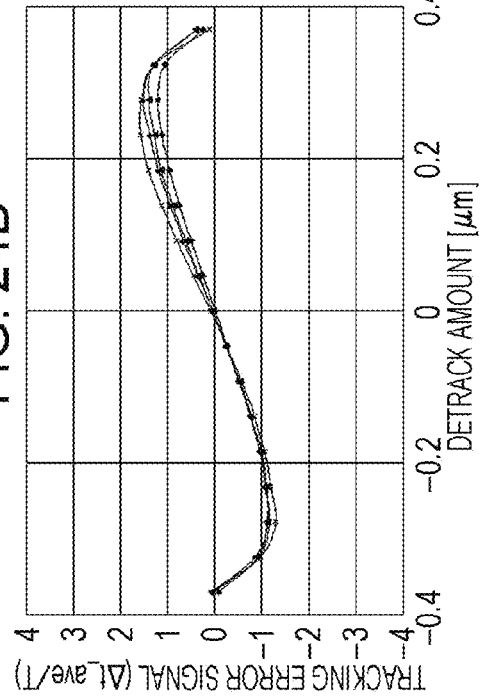

On the other hand, in the optical disc apparatus 20 according to the invention, in the case where the optical disc 100 of which the pit height is $\lambda/4$ is used and the central width ratio is set to 0, 17.5, 27.5, and 50 [%], the graphs are obtained as illustrated in FIGS. 24A, 24B, 24C, and 24D. In addition, FIGS. 24A and 24B illustrate the same graphs as those of FIGS. 20A and 21A again for comparison.

Comparing with FIGS. 24A to 24D, particularly, in the case where the central width ratio is 27.5 [%] (FIG. 24C), although the lens shift amount is increased up to 0.8 [mm], the waveform is not changed from the standard characteristic, and a good characteristic is maintained. In addition, at this time, the value of the tracking error signal is a sufficiently large value, which denotes that it is possible to efficiently perform the tracking control by the optical disc apparatus 20.

In comparison with the case of the optical disc apparatus 20 (FIG. 24C) according to the invention and the case of the optical disc apparatus 50 (FIG. 24A) in the related art, this denotes that the deterioration in the quality of the tracking error signal caused by the lens shift does not easily occur.

However, it may be understood that, in the case where the central width ratio is 50 [%] (FIG. 24D), although the lens shift amount is increased up to 0.8 [mm], the change from the standard characteristic does not almost occur, but the value of the tracking error signal becomes small on the whole. In other words, it is estimated from FIGS. 24C and 24D that, as the central width ratio is increased, the value of the tracking error signal is decreased.

In general, if the value of the tracking error signal is too small (that is, the sensitivity is too low), the accuracy of the tracking control deteriorates. For this reason, in the optical disc apparatus 20, it is considered that the central width ratio is preferably set to be equal to or less than about 50 [%].

In addition, it is considered that a lower limit value of the central width ratio may be a range where, for example, in the case where the lens shift occurs as illustrated in FIG. 4A, the phase changing range HA moves to exceed the division line N0 but it does not exceed the division line N2, in other words, a range where the phase changing range HA does not protrudes into the area 37B.

Figure 25A:
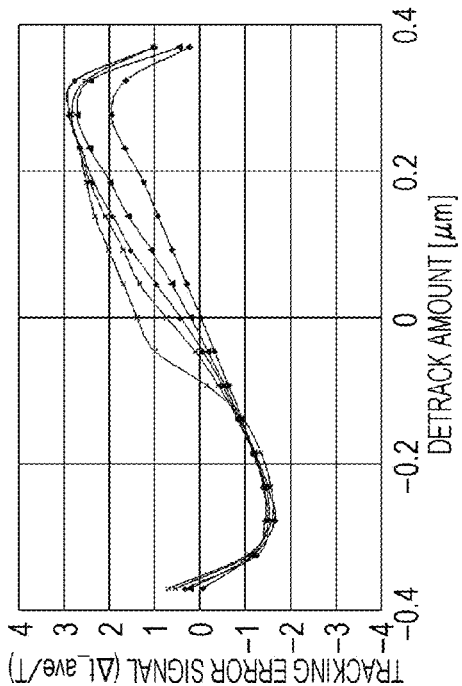
FIGS. 25A to 25D are schematic diagrams illustrating a relationship between a detrack amount and a tracking error signal when an optical disc having a pit height of $\lambda/6$ is used for an optical disc apparatus according to the invention.
Figure 25C:
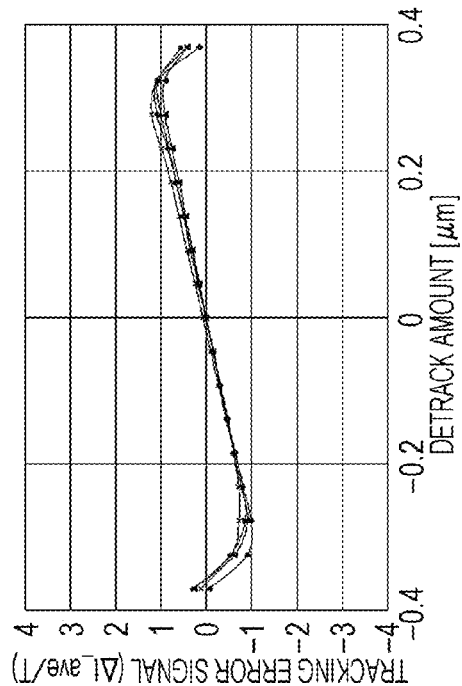
Figure 25B:
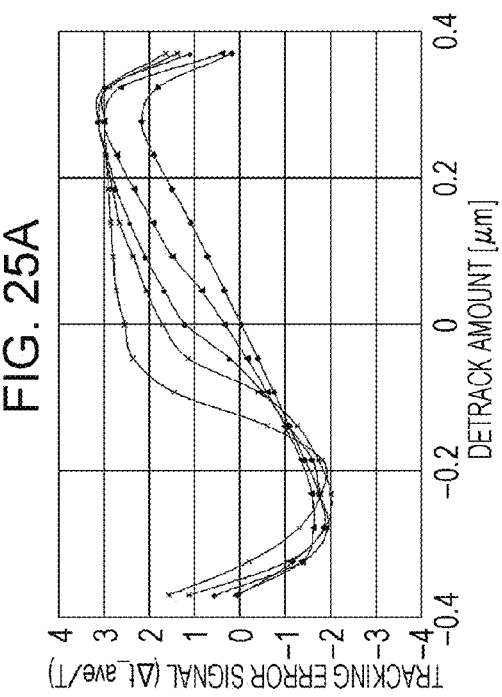
Figure 25D:
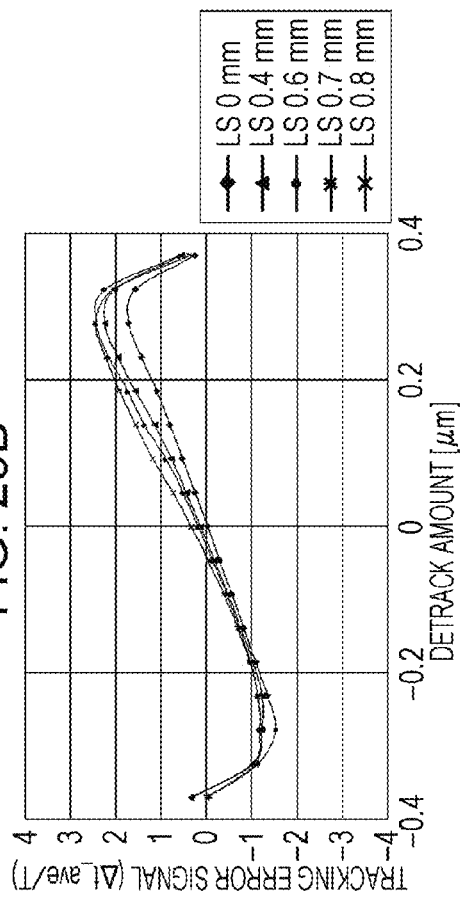

In addition, in the optical disc apparatus 20 according to the invention, in the case where the optical disc 100 of the pit height is $\lambda/6$ is used and the central width ratio is set to 0, 17.5, 27.5, and 50 [%], the graphs are obtained as illustrated in FIGS. 25A, 25B, 25C, and 25D. In addition, FIGS. 25A and 25B illustrate the same graphs as those of FIG. 20B and FIG. 21B again for comparison.

Comparing with FIGS. 25A to 25D, particularly, in the case where the central width ratio is 27.5 [%] (FIG. 25C), although the lens shift amount is increased up to 0.8 [mm], an offset does not almost occur, and the change width from the standard characteristic is also greatly decreased.

In addition, even in the case where the central width ratio is 50 [%] (FIG. 25D), although the lens shift amount is increased up to 0.8 [mm], an offset does not almost occur, and although the value of the tracking error signal becomes small on the whole, the change width from the standard characteristic is also greatly decreased.

Accordingly, it is understood that, in the optical disc apparatus 20 according to the invention, even in the case where the pit height of the optical disc 100 is $\lambda/6$, which is a value deviating from the standard value, it is possible to generate a very good tracking error signal, so that it is possible to perform the tracking control at high accuracy.

[1-7. Operation and Effects]

In the above configuration, in the optical pickup 24 of the optical disc apparatus 20, the hologram plate 37 is divided into three in the radial direction (FIG. 9), so that the reflected light beam LR is diffracted in the central area 37Z more than in the peripheral areas 37AD and 37BC.

The photodetector 38 receives the positive reflected light beam LRPZ, which is divided by the area 37Z, in a manner of division by two in the tangential direction by the light detecting areas 38Z1 and 38Z2 of the light detecting area group 38G4 to generate light detecting signals SZ1 and SZ2 according to the received light amounts.

In addition, the photodetector 38 receives the positive reflected light beams LRPX and LRPY, which are divided by the areas 37AD and 37BC, by the light detecting areas of the light detecting area group 38G1 to generate light detecting signals SA1, SA2, SB1, SB2, SC1, SC2, SD1, and SD2.

The signal processing unit 23 generates the light detecting signals SA and SB by the calculation of Equations (9) and (10) and generates the central values SMA and SMB by adding a product of ½ and the light detecting signal SZ1 to the light detecting signals SA and SB according to Equations (2) and (3).

In addition, the signal processing unit 23 generates the light detecting signals SC and SD by the calculation of Equations (11) and (12) and generates the central values SMC and SMD by adding a product of ½ and the light detecting signal SZ2 to the light detecting signals SC and SD according to Equations (4) and (5).

After that, in the optical disc apparatus 20, the signal processing unit 23 generates the tracking error signal STE by the DPD method by using the central values SMA to SMD according to Equation (6), and the driving controller 22 performs the tracking control of the objective lens 28 based on the tracking error signal STE.

Therefore, in the optical disc apparatus 20, even in the case where the phase changing ranges HA to HD of the reflected light beam LR exceed the center line N0 in the radial direction on the hologram plate 37 due to the occurrence of the lens shift, the components of the phase changing ranges HA to HD may be included in the central values SMA to SMD.

As a result, in the optical disc apparatus 20, it is possible to generate a high-quality tracking error signal STE where the components of the phase differences occurring in the phase changing ranges HA to HD are reflected without omission.

Therefore, in the optical disc apparatus 20, even in the case where the lens shift occurs, the characteristic of the change of the tracking error signal with respect to the detrack amount may be allowed to be a good characteristic close to that of the case where the lens shift does not occur (FIG. 21A).

In other words, in the optical disc apparatus 20, even in the case where the lens shift amount is increased, it is possible to prevent a deterioration in the accuracy of the tracking control, so that it is possible to increase a margin with respect to the lens shift in comparison with the optical disc apparatuses 50, 60, and 70 in the related art.

In addition, in the optical disc apparatus 20 even in the case where the pit height of the optical disc 100 is λ/6 which deviates from the standard value, it is possible to generate the tracking error signal STE by reducing the occurring amount of the offset or by allowing the offset to rarely occur in comparison with the optical disc apparatus 50, 60, or 70 in the related art (FIGS. 23 and 25).

For this reason, in the optical disc apparatus 20, it is possible to increase a probability where the tracking control may also be performed on the low-quality optical disc 100 of which the pit height deviates from the standard value, so that it is possible to decrease the frequency of occurrence of error in the recording process or the reproducing process.

Furthermore, in the optical disc apparatus 20, even in the case where the tracking error signal STE is generated by using the central values SMA to SMD according to the DPP method according to Equation (13), the signal level is maintained in the level equal to that of the optical disc apparatus 60 in the related art, so that the signal level is not decreased carelessly.

In addition, similarly to the optical disc apparatuses 60 and 70 in the related art, in the optical disc apparatus 20, it is possible to prevent the illumination of the other-layer stray lights WPX and WPY on the sub light detecting areas of the photodetector 38 (FIG. 12), so that it is possible to improve the quality of the tracking error signal STE according to the DPP method.

Furthermore, in comparison with the optical disc apparatus 70 in the related art, in the optical disc apparatus 20, it is possible to prevent bad influence of the amplification noise on the reproducing RF signal SRF, so that it is possible to improve the quality thereof.

Furthermore, in the optical disc apparatus 20, the configurations of the areas 37AD and 37BC of the hologram plate 37 and the configurations of the light detecting area groups 38G1 and 38G5 of the photodetector 38 are not changed from those of the optical disc apparatuses 50, 60, and 70 in the related art.

For this reason, the optical disc apparatus 20 may generate the focus error signal SFE without deterioration in the quality thereof by the same SSD method as that of the related art to perform the focusing control at high accuracy.

Furthermore, in comparison with the optical disc apparatus 70 in the related art, in the optical disc apparatus 20, since it is possible to reduce the number of light detecting areas provided to the photodetector 38, it is possible to reduce the number of amplifier circuits mounted on the respective light detecting areas in the photodetector 38, so that it may be possible to decrease an amount of heat released by the amplifier circuits.

According to the above configurations, the optical disc apparatus 20 generates the light detecting signals SZ1 and SZ2 indicating the light amounts in the divided areas 37Z1 and 37Z2 (FIGS. 4A to 4C) and generates the light detecting signals SA to SD indicating the light amounts in the divided areas 37A to 37D. Subsequently, the optical disc apparatus 20 generates the tracking error signal STE according to the DPD method based on the central values SMA and SMB, each of which is obtained by adding a product of ½ and each of the light detecting signals SA and SB to the light detecting signal SZ1, and the central values SMC and SMD, each of which is obtained by adding a product of ½ and each of the light detecting signals SC and SD to the light detecting signal SZ2 and performs the tracking control of the objective lens 28. Therefore, even in the case where the lens shift occurs, the optical disc apparatus 20 may generate a high-quality tracking error signal STE which the components of the phase changing ranges HA to HD are reflected on.

2. Second Embodiment

[2-1. Basic Principle of Second Embodiment]

Figure 26A:
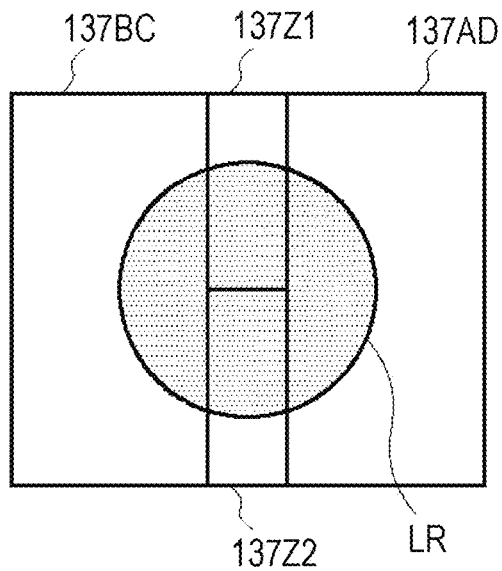
FIGS. 26A and 26B are schematic diagrams illustrating spot dividing light reception according to a second embodiment.
Figure 26B:
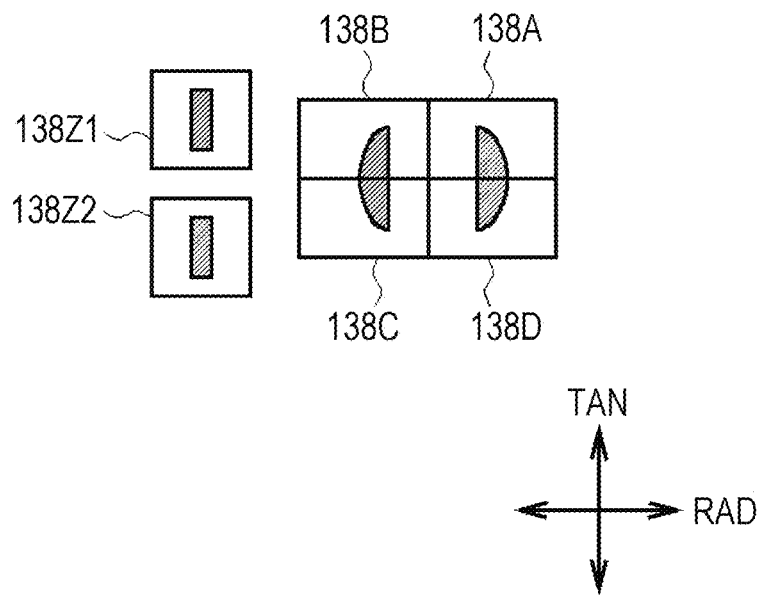

As diagrammatically illustrated in FIGS. 26A and 26B corresponding to FIGS. 3A and 3B, the configurations of the hologram plate 137 and the photodetector 138 according to the second embodiment are partially different from the hologram plate 37 and the photodetector 38 according to the first embodiment.

The hologram plate 137 is different from the hologram plate 13 in that the central portion is also divided into two in the tangential direction into areas 137Z1 and 137Z2.

The areas 137Z1 and 137Z2 are configured to generate two reflected light beams LRZ1 and LRZ2 by allowing the holograms formed thereon to greatly diffract the reflected light beams LR in the radial direction and to diffract the reflected light beams LR in the directions opposite to each other in the tangential direction.

The photodetector 138 is different from the photodetector 38 in that the light detecting areas 138Z1 and 138Z2 are disposed to be separated from each other in the tangential direction to receive the reflected light beams LRZ1 and LRZ2, respectively.

For this reason, similarly to the first embodiment, in the second embodiment, the reflected light beam LR is configured to be divided into the divided areas as illustrated in FIG. 4B.

On the other hand, in the following signal process or the like according to the second embodiment, the same calculation process or the like as those of the first embodiment are performed.

In other words, the second embodiment is different from the first embodiment in that the central portion of the reflected light beam LR is divided into two in the tangential direction by the hologram plate 137 in advance.

[2-2. Configurations of Optical Disc Apparatus and Optical Pickup]

The optical disc apparatus 120 (FIG. 5) according to the second embodiment is different from the optical disc apparatus 20 according to the first embodiment in that an optical pickup 124 instead of the optical pickup 24 is installed. However, the other configurations are the same as those of the optical disc apparatus 20.

Figure 27:
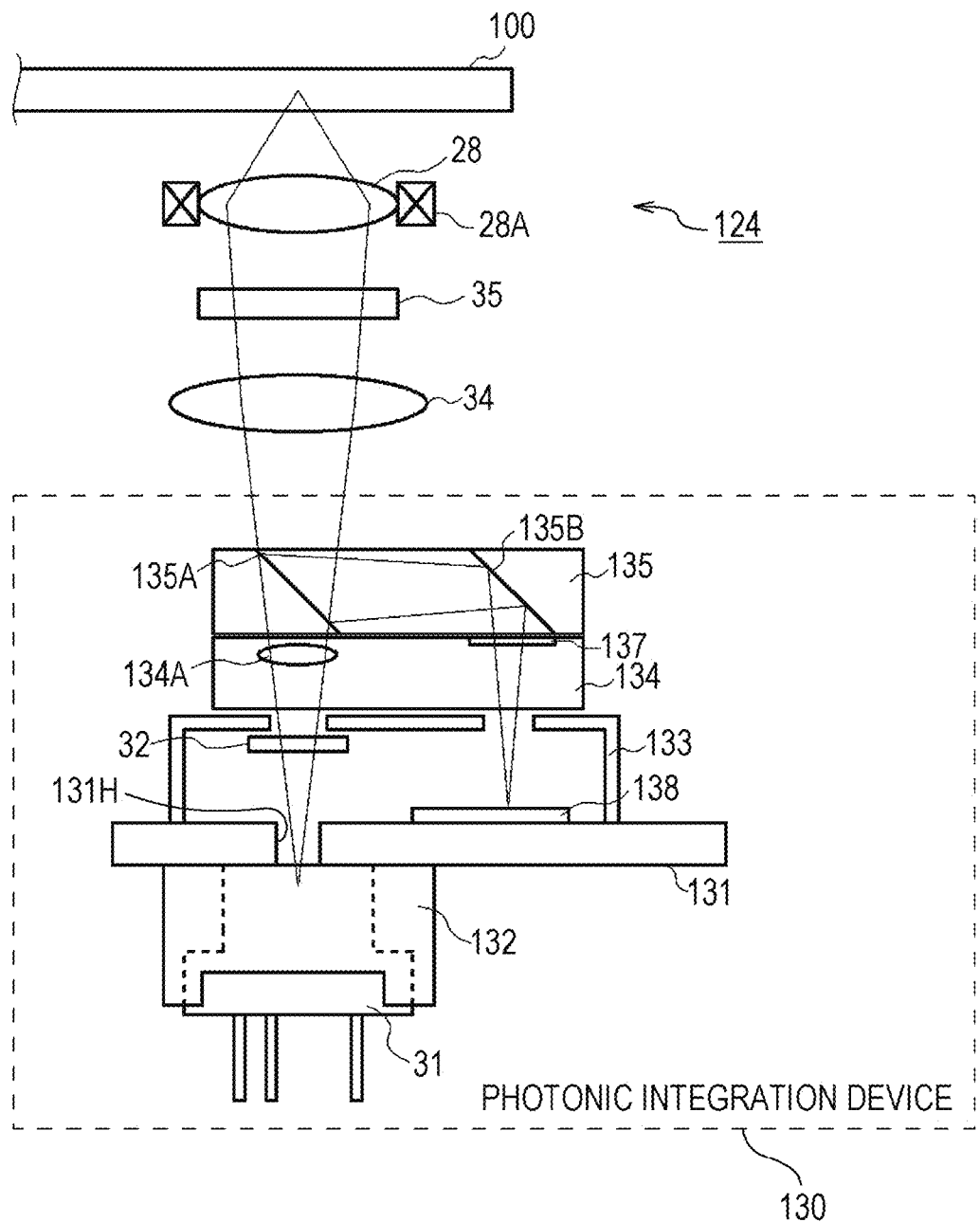
FIG. 27 is a schematic diagram illustrating a configuration of an optical pickup according to the second embodiment.

As illustrated in FIG. 27 where the corresponding portions of FIG. 7 are denoted by the same reference numerals, the optical pickup 120 is greatly different from the optical pickup 24 in that a plurality of optical parts are integrated into a photonic integrated device 130.

The photonic integrated device 130 is configured so that a lens holder 132 is mounted on the one surface of a substrate 131 formed in a plate shape and a spacer 133, a composite lens 134, and a laminated prism 135 are sequentially laminated on the opposite surface.

The laser holder 132 is configured to hold the laser diode 31 on the substrate 131. The laser diode 31 emits the light beam L based on the control of the controller 21 (FIG. 5) and propagates the light beam L to the opposite side of the substrate 131 through a hole portion 131H provided to the substrate 131.

In the spacer 133, a space is formed in the inner portion thereof, and a grating 32 is disposed. Similarly to the first embodiment, the grating 32 spectroscopically disperses the light beam L into a main beam and two sub beams.

In the composite lens 134, a coupling lens 134A and a hologram plate 137 are provided. The coupling lens 134A transforms the dispersion angle of the light beam L to be incident on the laminated prism 135.

In the laminated prism 135, a polarization plane 135A having the same function as that of the polarization plane 33S of the polarizing beam splitter 33 and a mirror plane 135B are provided. The polarization plane 135A transmits the light beam L having P-polarization to be incident on the collimator lens 34.

After that, similarly to the case of the optical pickup 24 (FIG. 7), the optical pickup 124 performs appropriate optical operations on the light beam L by using the collimator lens 34, the ¼ wavelength plate 35, and the objective lens 28 and illuminates the optical disc 100 with the light beam L. At this time, the light beam L is reflected on the target recording layer YT (FIG. 6A) of the optical disc 100, so that a reflected light beam LR is generated.

Similarly to the case of the optical pickup 24, the optical pickup 124 performs predetermined optical operations on the reflected light beam LR by using the objective lens 28, the ¼ wavelength plate 35, and the collimator lens 34 to be incident on the laminated prism 135 of the photonic integrated device 130.

The laminated prism 135 reflects the reflected light beam LR having S-polarization sequentially by the polarization plane 135A and the mirror plane 135B to be incident on the hologram plate 137 of the composite lens 134.

Figure 28:
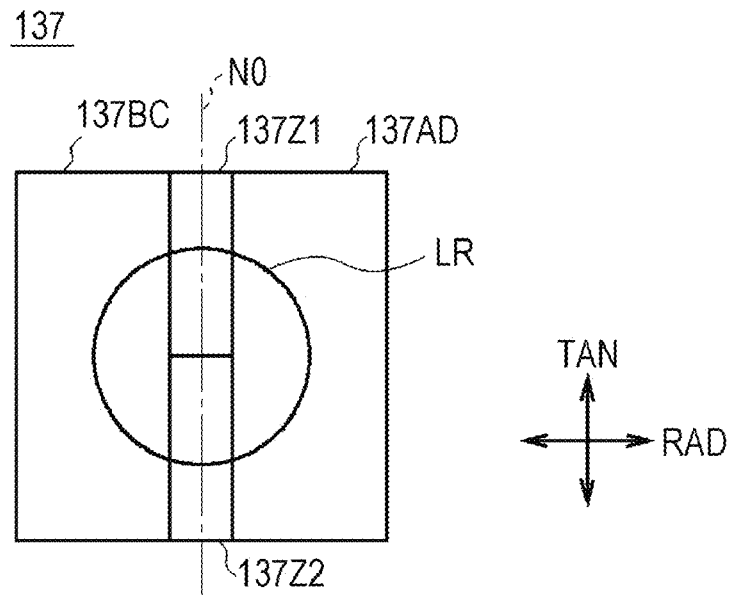
FIG. 28 is a schematic diagram illustrating a configuration of a hologram plate according to the second embodiment.

As illustrated in FIG. 28 corresponding to FIGS. 9 and 26A, the hologram plate 137 is divided into three in the radial direction, so that the two ends thereof become the areas 137AD and 137BC. In addition, the central portion of the hologram plate 137 in the radial direction is divided into two in the tangential direction, so that the areas 137Z1 and 137Z2 are formed.

Holograms having different diffraction directions are formed in the areas 137AD, 137BC, 137Z1, and 137Z2.

Figure 29:
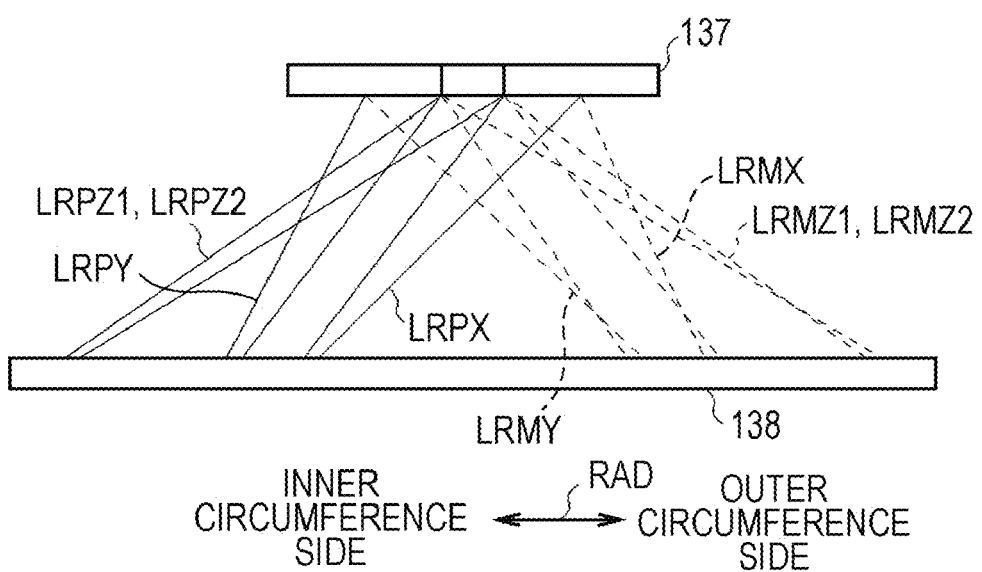
FIG. 29 is a schematic diagram illustrating diffraction and splitting of a light beam according to the second embodiment.

The same holograms as those in the areas 37AD and 37BC according to the first embodiment are formed in the areas 137AD and 137BC. For this reason, as illustrated in FIG. 29 corresponding to FIG. 10, the hologram plate 137 diffracts the reflected light beams LRPX and LRPY to the inner circumference side and the reflected light beams LRMX and LRMY to the outer circumference side to illuminate the photodetector 138.

The areas 137Z1 and 137Z2 diffract portions of the reflected light beam LR, which are illuminated thereon, to generate the reflected light beams LRPZ1 and LRMZ1 and the reflected light beams LRPZ2 and LRMZ2 having positive and negative primary light, respectively. At this time, the hologram plate 137 allows the reflected light beams LRPZ1 and LRPZ2 to propagate to be opposite to each other in the tangential direction and illuminates the photodetector 138 with the reflected light beams LRPZ1 and LRPZ2.

The photodetector 138 is mounted on the surface of the substrate 131 in the space of the spacer 133, and similarly to the first embodiment, a plurality of light detecting area groups and a plurality of light detecting areas are disposed. However, some configurations are different.

Figure 30:
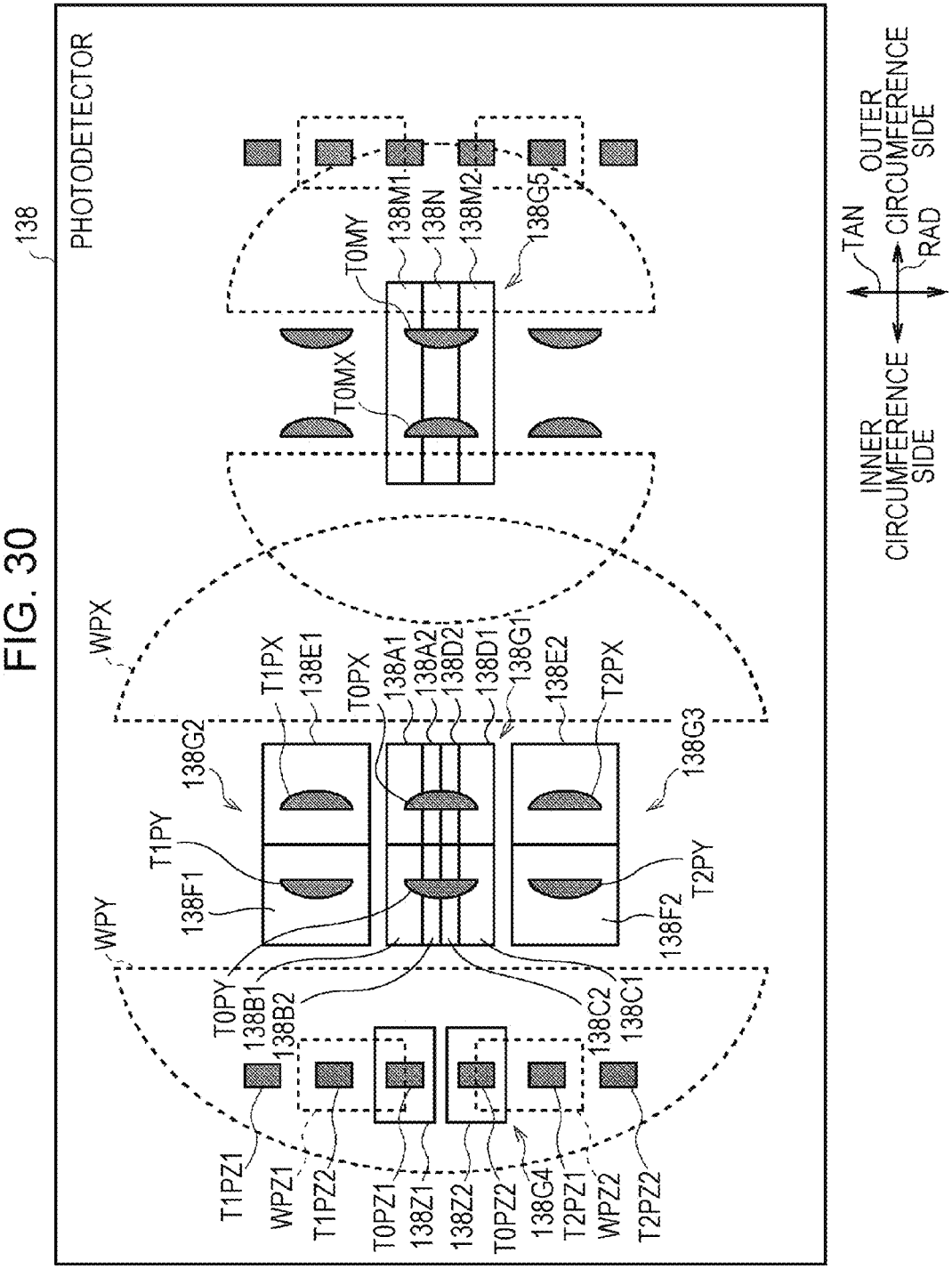
FIG. 30 is a schematic diagram illustrating a configuration of a photodetector according to the second embodiment.

In other words, as illustrated in FIG. 30 corresponding to FIG. 12, the photodetector 138 includes light detecting area groups 138G1, 138G2, 138G3, and 138G5, which are similar to the light detecting area groups 38G1, 38G2, 38G3, and 38G5 in the photodetector 38.

On the other hand, unlike the light detecting area group 38G4 (FIG. 12), in the light detecting area group 138G4, the light detecting areas 138Z1 and 138Z2 are disposed to be separated from each other in the tangential direction.

The light detecting areas 138Z1 and 138Z2 receive the reflected light beams LRPZ1 and LRPZ2 to generate light detecting signals SZ1 and SZ2 and supply the light detecting signals SZ1 and SZ2 to the signal processing unit 23 (FIG. 5), respectively.

In addition, in the light detecting area group 138G1, the light detecting areas 138A1, 138Z2, 138B1, 138B2, 138C1, 138C2, 138D1, and 138D2 generate the light detecting signals SA1, SA2, SB1, SB2, SC1, SC2, SD1, and SD2 and supply the light detecting signals SA1, SA2, SB1, SB2, SC1, SC2, SD1, and SD2 to the signal processing unit 23, respectively.

The signal processing unit 23 performs the same calculation processes as those of the first embodiment. In other words, the signal processing unit 23 calculates the light detecting signals SA, SB, SC, and SD according to Equations (9) to (12) and generates the central values SMA, SMB, SMC, and SMD according to Equations (2) to (5).

In addition, in the case of using the DPD method, the signal processing unit 23 calculates the phase signals φSMA, φSMB, φSMC, and φSMD and calculates the tracking error signal STE according to Equation (6). In addition, in the case of using the DPP method, the signal processing unit 23 calculates the tracking error signal STE according to Equation (13).

In this manner, in the optical pickup 124, the central portion of the reflected light beam LR in the radial direction is divided into two in the tangential direction by the hologram plate 137 to generate positive reflected light beams LRPZ1 and LRPZ2, and the reflected light beams LRPZ1 and LRPZ2 are independently received by the light detecting portions 138Z1 and 138Z2 of the photodetector 138.

Therefore, similarly to the first embodiment, the optical disc apparatus 120 is configured to generate the tracking error signal STE and to perform the tracking control.

[2-3. Operation and Effects]

In the above configuration, in the optical pickup 124 of the optical disc apparatus 120, the hologram plate 137 is divided into three in the radial direction and the central portion thereof is divided into two in the tangential direction (FIG. 28); and the reflected light beam LR is greatly diffracted in the central areas 137Z1 and 138Z2 in comparison with the peripheral areas 137AD and 137BC and separated from each other.

In the photodetector 138, the positive reflected light beams LRPZ1 and LRPZ2 divided by the areas 137Z1 and 137Z2 are received by the light detecting areas 138Z1 and 138Z2 of the light detecting area group 138G4, and the light detecting signals SZ1 and SZ2 are generated according to the received light amounts thereof.

In addition, in the photodetector 138, the positive reflected light beams LRPX and LRPY divided by the areas 137AD and 137BC are received by the light detecting areas of the light detecting area group 138G1, and the light detecting signals SA1, SA2, SB1, SB2, SC1, SC2, SD1, and SD2 are generated.

Similarly to the first embodiment, the signal processing unit 23 generates the light detecting signals SA and SB by the calculation of Equations (9) and (10) and generates the central values SMA and SMB by adding a product of ½ and the light detecting signal SZ1 to the light detecting signals SA and SB according to Equations (2) and (3).

In addition, the signal processing unit 23 generates the light detecting signals SC and SC by the calculation of Equations (11) and (12) and generates the central values SMC and SMD by adding a product of ½ and the light detecting signal SZ2 to the light detecting signals SC and SD according to Equations (4) and (5).

After that, in the optical disc apparatus 120, the tracking error signal STE according to the DPD method is generated by using the central values SMA to SMD according to Equation (6) by the signal processing unit 23, and the tracking control of the objective lens 28 is performed based on the tracking error signal STE by the driving controller 22.

Therefore, similarly to the first embodiment, in the optical disc apparatus 120, even in the case where the phase changing ranges HA to HD of the reflected light beam LR exceed the center line N0 in the radial direction on the hologram plate 137 due to the occurrence of the lens shift, the components of the phase changing ranges HA to HD may be included in the central values SMA to SMD.

As a result, in the optical disc apparatus 120, it is possible to generate a high-quality tracking error signal STE where the components of the phase differences occurring in the phase changing ranges HA to HD are reflected without omission.

Therefore, similarly to the first embodiment, in the optical disc apparatus 120, even in the case where the lens shift occurs, the characteristic of the change of the tracking error signal with respect to the detrack amount may be allowed to be a good characteristic close to that of the case where the lens shift does not occur (FIG. 21A).

In addition, in the second embodiment, since the reflected light beam is split into the reflected light beams LRPZ1 and LRPZ2 in advance by the hologram plate 137, the degree of freedom in the layout of the light detecting areas 138Z1 and 138Z2 in the photodetector 138 may be increased by adjusting the diffraction angle and the diffraction direction of each of the reflected light beams LRPZ1 and LRPZ2.

Regarding the other points, the optical disc apparatus 120 may be able to exhibit the same operations and effects as those of the optical disc apparatus 20 according to the first embodiment.

According to the above configurations, similarly to the first embodiment, the optical disc apparatus 120 generates the light detecting signals SZ1 and SZ2 indicating the light amounts in the divided areas 37Z1 and 37Z2 (FIGS. 4A to 4C) and generates the light detecting signals SA to SD indicating the light amounts in the divided areas 37A to 37D. Subsequently, the optical disc apparatus 120 generates the tracking error signal STE by the DPD method based on the central values SMA and SMB, each of which is obtained by adding a product of ½ and each of the light detecting signals SA and SB to the light detecting signal SZ1, and the central values SMC and SMD, each of which is obtained by adding a product of ½ and each of the light detecting signals SC and SD to the light detecting signal SZ2 and performs the tracking control of the objective lens 28. Therefore, similarly to the first embodiment, even in the case where the lens shift occurs, the optical disc apparatus 120 may generate a high-quality tracking error signal STE which the components of the phase changing ranges HA to HD are reflected on.

3. Other Embodiments

In addition, in the aforementioned first embodiment, the case where each of the central values SMA to SMD is calculated by adding a product of a coefficient of ½ and the light detecting signal SZ1 or SZ2 to each of the light detecting signals SA to SD according to Equations (2) to (5) is described.

The invention is not limited thereto, and each of the central values SMA to SMD may be calculated by adding an arbitrary coefficient and the light detecting signal SZ1 or SZ2 to each of the light detecting signals SA to SD.

In addition, in the aforementioned first embodiment, the case where the optical disc apparatus 20 generates the tracking error signal STE according to the DPD method and the DPP method is described.

The invention is not limited thereto, but the optical disc apparatus 20 may be configured to generate the tracking error signal STE by various methods such as a push-pull method. In this case, the important point is to define the width d1 (FIG. 9) of the central divided area so that, in the case where the changing range (for example, the phase changing range HA) of the reflected light beam LR, where characteristic component appears according to the change of the light intensity in the associated method, is moved due to the lens shift, the changing range does not exceed the division line N1 or N2 at the opposite side of the changing range although the changing range exceeds the division line N0 (FIGS. 4A to 4C). With respect to the second embodiment, the same description is made.

Furthermore, in the aforementioned second embodiment, the case where all the light detecting areas 138Z1 and 138Z2 are disposed to the inner circumference side of the light detecting area group 138G1 is described.

The invention is not limited thereto, but the light detecting areas 138Z1 and 138Z2 may be disposed at various different positions. In this case, the other-layer stray light generated by the central portion of the hologram plate may be designed not to be illuminated on the sub light detecting area.

For example, as illustrated in FIGS. 31A, 31B, and 31C corresponding to FIGS. 9, 10, and 12, the optical pickup 224 according to another embodiment diffracts the reflected light beam LRPZ1 in the area 237Z1 of the hologram plate 237 to a slightly inner circumference side of the preceding side and diffracts the reflected light beam LRPZ2 in the area 237Z2 to a slightly inner circumference side of the following side.

In the photodetector 238, a light detecting area 238Z1 instead of the light detecting area 138Z1 is disposed to a preceding side as well as a slightly outer circumference side of the light detecting area group 238G1, and a light detecting area 238Z2 instead of the light detecting area 138Z2 is disposed to a following side as well as a slightly outer circumference side of the light detecting area group 238G1.

In an optical disc apparatus using the optical pickup 224 having such a configuration, the same light detecting signals as those of the first embodiment may be generated.

Furthermore, in the aforementioned first embodiment, the case where the areas 37AD and 37BC of the hologram plate 37 are not divided in the tangential direction but divided in the tangential direction by the boundary lines of the light detecting areas when the light reception is performed by the photodetector 38 is described.

The invention is not limited thereto, but for example, each of the areas 37AD and 37BC of the hologram plate 37 is divided into two in the tangential direction, and the diffraction directions are to be opposite to each other in the tangential direction, so that the photodetector 38 may perform light reception by the light detecting areas which are separated from each other in the tangential direction. With respect to the second embodiment, the same description is made.

Furthermore, in the aforementioned first embodiment, the case of defining the width d1 of the central area 37Z on the hologram plate 37 so as for the central width ratio to be set to 17.5 [%] or 27.5 [%] based on the simulation results of FIGS. 22 to 25 is described.

The invention is not limited thereto, and the width d1 of the area 37Z may be defined so that the central width ratio becomes an arbitrary value. In this case, for example, even in the case where the phase changing range HA protrudes from the area 37AD and is moved toward the innermost circumference side when the lens shift occurs, the width d1 may be defined so that the phase changing range HA stops within the central area 37Z not to exceed the division line N2 (FIGS. 4A to 4C) of the opposite side.

Furthermore, in the aforementioned first embodiment, the case where the reflected light beam LR is split into a plurality of light beams by the hologram plate 37 where holograms having different diffraction angles and diffraction directions are formed in respective areas is described.

The invention is not limited thereto, but the reflected light beam LR may be split into a plurality of the light beams by various other optical members such as a diffraction grating. With respect to the second embodiment, the same description is made.

Furthermore, in the aforementioned first embodiment, the case where the signal processing unit 23 generates the focus error signal SFE according to the SSD method, and each the light detecting area groups 38G1 and 38G5 of the photodetector 38 is at least three divided in the tangential direction according to the focus error signal SFE is described.

The invention is not limited thereto, but the focus error signal SFE may be generated according to various other methods such as an astigmatic method. In this case, each of the light detecting areas of the photodetector 38 may be configured according to the method.

Furthermore, in the aforementioned first embodiment, the case where the optical disc apparatus 20 illuminates the optical disc 100 having the recording layer Y, which is constructed with two layers, with the light beam L is described.

The invention is not limited thereto, but the optical disc apparatus 20 may illuminate an optical disc having the recording layer Y, which is constructed with three or more layers, with the light beam L. With respect to the second embodiment, the same description is made.

Furthermore, in the aforementioned first embodiment, the case where the invention is adapted to the optical disc apparatus 20 which records information on the optical disc 100 and reproduces information from the optical disc 100 is described.

The invention is not limited thereto, but the invention may be adapted to, for example, an optical disc reproducing apparatus which reproduces information from the optical disc 100. With respect to the second embodiment, the same description is made.

Furthermore, in the aforementioned first embodiment, the case where the optical disc apparatus 20 records information on a DVD type optical disc 100 and reproduces information from the optical disc 100 is described.

The invention is not limited thereto, but information may be recorded on an optical disc according to various other types such as a BD type or a CD type, and information may be reproduced from the optical disc. In addition, the invention may be adapted to a multi-type optical disc. With respect to the second embodiment, the same description is made.

Furthermore, in the aforementioned embodiments, the case where the optical pickup 24 as an optical pickup is constructed with the laser diode 31 as a light source, the objective lens 28 as an objective lens, the driving controller 22 and the actuator 28A as a lens moving unit, the hologram plate 37 as a light splitting device, and the photodetector 38 as a light detection device is described.

However, the invention is not limited thereto, but the optical pickup may be constructed with a light source, an objective lens, a lens moving unit, a light splitting device, and a light detection device, each of which is constructed with various other configurations.

Furthermore, in the aforementioned embodiments, the case where the optical disc apparatus 20 as an optical disc apparatus is constructed with the laser diode 31 as a light source, the objective lens 28 as an objective lens, the driving controller 22 and the actuator 28A as a lens moving unit, the hologram plate 37 as a light splitting device, the photodetector 38 as a light detection device, and the signal processing unit 23 as a signal processing unit is described.

However, in the invention is not limited thereto, but the optical disc apparatus may be constructed with a light source, an objective lens, a lens moving unit, a light splitting device, a light detection device, and a signal processing unit, each of which is constructed with various other configurations.

The present application contains subject matter related to that disclosed in Japanese Priority Patent Application JP 2010-001414 filed in the Japan Patent Office on Jan. 6, 2010, the entire contents of which are hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:
1. An optical pickup comprising:
a light source configured to emit a light beam;
an objective lens configured to collect the light beam on a desired recording layer among one recording layer or two recording layers or more, which are installed in an optical disc and where tracks having a spiral shape or a concentric shape are formed;

a lens moving unit configured to move the objective lens in a tracking direction directed toward at least an inner circumference side or an outer circumference side of the optical disc;

a light splitting device configured to split a reflected light beam reflected by recording layer into a plurality of reflected light beams and to propagate the plurality of reflected light beams; and a light detection device configured to generate a central light detecting signal, an inner circumference side light detecting signal, and an outer circumference side light detecting signal according to received light amounts thereof by a central light detecting area, an inner circumference side light detecting area, and an outer circumference side light detecting area, which receive a central portion, an inner circumference side portion, and an outer circumference side portion of an image of the reflected light beam in a radial direction of the optical disc and to allow a predetermined signal processing unit to generate a tracking error signal by using the inner circumference side light detecting signal and the outer circumference side light detecting signal, each of which is added with a product of a predetermined coefficient and the central light detecting signal;

wherein the light detection device generates a central preceding side light detecting signal, a central following side light detecting signal, an inner circumference preceding side light detecting signal, an inner circumference following side light detecting signal, an outer circumference preceding side light detecting signal, and an outer circumference following side light detecting signal according to received light amounts thereof by a central preceding side light detecting area, a central following side light detecting area, an inner circumference preceding side light detecting area, an inner circumference following side light detecting area, an outer circumference preceding side light detecting area, and an outer circumference following side light detecting area, which receive a central portion of an image of the reflected light beam in the radial direction of the optical disc and a preceding side portion and a following side portion of each of an inner circumference side portion and an outer circumference side portion in the tracking direction of a track, and wherein the signal processing unit generates the tracking error signal by using the inner circumference preceding side light detecting signal and the outer circumference preceding side light detecting signal, each of which is added with a product of a predetermined coefficient and the central preceding side light detecting signal, and the inner circumference following side light detecting signal and the outer circumference following side light detecting signal, each of which is added with a product of a predetermined coefficient and the central following side light detecting signal.

2. The optical pickup according to claim 1, wherein the light splitting device allows the central portion of the image of the reflected light beam in the radial direction of the optical disc and the inner circumference side portion and the outer circumference side portion to propagate in different directions, and wherein the light detection device is configured so that the central preceding side light detecting area and the central following side light detecting area, the inner circumference preceding side light detecting area and the inner circumference following side light detecting area, and the outer circumference preceding side light detecting area and the outer circumference following side light detecting area are disposed to be adjacent to each other in the tracking direction of the track on the image of the reflected light beam.

3. The optical pickup according claim 1, wherein the light splitting device allows a central preceding side portion and a central following side portion, which are constructed with a preceding side and a following side in the tracking direction of the track, among the central portion of the image of the reflected light beam in the radial direction of the optical disc to propagate in different directions, and wherein the light detection device is configured so that the central preceding side light detecting area and the central following side light detecting area are disposed to be separated from each other.

4. The optical pickup according to claim 1, wherein in the light splitting device, a width of the central portion in the radial direction is defined so that, when the objective lens is moved in the tracking direction, in a case where a range, of which a light intensity on the image of the reflected light beam is changed according to a deviation amount between the light beam and the track in the tracking direction, protrudes from the inner circumference side portion or the outer circumference side portion, the range enters the central portion.

5. The optical pickup according to claim 4, wherein in the light splitting device, the width of the central portion in the radial direction is a half or less of a full beam width of the image of the reflected light beam in the radial direction of the optical disc.

6. An optical disc apparatus comprising:

a light source configured to emit a light beam;

an objective lens configured to collect the light beam on a desired recording layer among one recording layer or two recording layers or more, which are installed in an optical disc and where tracks having a spiral shape or a concentric shape are formed;

a lens moving unit configured to move the objective lens in a tracking direction directed toward at least an inner circumference side or an outer circumference side of the optical disc;

a light splitting device configured to split a reflected light beam reflected by recording layer into a plurality of reflected light beams and to propagate the plurality of reflected light beams;

a light detection device configured to generate a central light detecting signal, an inner circumference side light detecting signal, and an outer circumference side light detecting signal according to received light amounts thereof by a central light detecting area, an inner circumference side light detecting area, and an outer circumference side light detecting area, which receive a central portion, an inner circumference side portion, and an outer circumference side portion of an image of the reflected light beam in a radial direction of the optical disc; and a signal processing unit configured to generate a tracking error signal based on the inner circumference side light detecting signal and the outer circumference side light detecting signal, each of which is added with a product of a predetermined coefficient and the central light detecting signal;

wherein the light detection device generates a central preceding side light detecting signal, a central following side light detecting signal, an inner circumference preceding side light detecting signal, an inner circumference following side light detecting signal, an outer circumference preceding side light detecting signal, and an outer circumference following side light detecting signal according to received light amounts thereof by a central preceding side light detecting area, a central following side light detecting area, an inner circumference preceding side light detecting area, an inner circumference following side light detecting area, an outer circumference preceding side light detecting area, and an outer circumference following side light detecting area, which receive a central portion of an image of the reflected light beam in the radial direction of the optical disc and a preceding side portion and a following side portion of each of an inner circumference side portion and an outer circumference side portion in the tracking direction of a track, and wherein the signal processing unit generates the tracking error signal by using the inner circumference preceding side light detecting signal and the outer circumference preceding side light detecting signal, each of which is added with a half of the central preceding side light detecting signal, and the inner circumference following side light detecting signal and the outer circumference following side light detecting signal, each of which is added with a half of the central following side light detecting signal, according to a DPD (Differential Phase Detection) method.

* * * * *